United States Patent
Noguchi et al.

(10) Patent No.: US 11,567,727 B2
(45) Date of Patent: Jan. 31, 2023

(54) RECORDING MEDIUM AND SOUND PROCESSING APPARATUS HAVING LIBRARY PROGRAM FOR MULTIPLE PROCESSORS

(71) Applicant: YAMAHA CORPORATION, Hamamatsu (JP)

(72) Inventors: Shintaro Noguchi, Hamamatsu (JP); Hajime Komura, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 25 days.

(21) Appl. No.: 17/008,935

(22) Filed: Sep. 1, 2020

(65) Prior Publication Data
US 2021/0064332 A1    Mar. 4, 2021

(30) Foreign Application Priority Data
Sep. 3, 2019    (JP) .............................. JP2019-160316

(51) Int. Cl.
*G06F 3/16*    (2006.01)

(52) U.S. Cl.
CPC .............. *G06F 3/165* (2013.01); *G06F 3/162* (2013.01)

(58) Field of Classification Search
CPC ........ G06F 3/162; G06F 3/165; G06F 9/3836; G06F 9/44521; G06F 9/4552; G06F 8/447
See application file for complete search history.

(56) References Cited

U.S. PATENT DOCUMENTS

| 2004/0064210 A1* | 4/2004 | Puryear | G06F 3/165 700/84 |
| 2018/0121180 A1* | 5/2018 | Chen | G06F 8/453 |

FOREIGN PATENT DOCUMENTS

JP    2001075758 A    3/2001

* cited by examiner

*Primary Examiner* — Joseph Saunders, Jr.
(74) *Attorney, Agent, or Firm* — Rossi, Kimms & McDowell LLP

(57) ABSTRACT

A library program includes a first executable code that defines steps of first processing of sound processing and that is written using an instruction set for the main processor, a second executable code that defines steps of second processing of the sound processing and that is written using an instruction set for a first processor, and a third executable code that defines the steps of the second processing of the sound processing and that is written using an instruction set for a second processor. The library program, when executed by the main processor provided in the sound processing apparatus, causes the main processor to: execute the first executable code; transmit, in a case where the sound processing apparatus further includes the first processor, the second executable code to the first processor; and transmit, in a case where the sound processing apparatus further includes the second processor, the third executable code to the second processor.

7 Claims, 14 Drawing Sheets

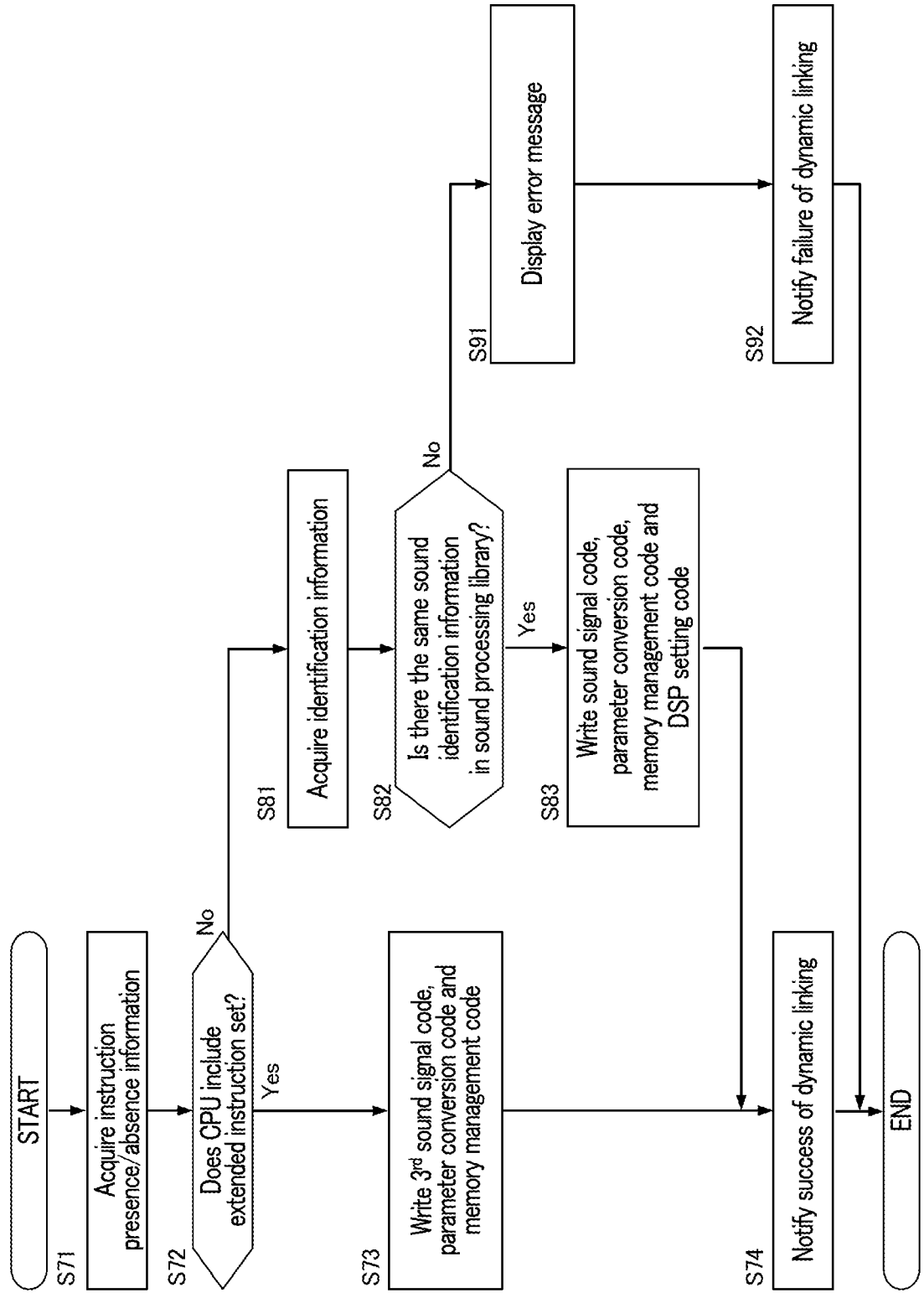

RECORDING MEDIUM AND SOUND PROCESSING APPARATUS HAVING LIBRARY PROGRAM FOR MULTIPLE PROCESSORS

CROSS REFERENCE TO RELATED APPLICATION

This application is based on, and claims priority from, Japanese Patent Application No. 2019-160316, which was filed on Sep. 3, 2019, the entire contents of which are incorporated herein by reference.

TECHNICAL FIELD

The present disclosure relates to recording mediums and to sound processing apparatuses.

DESCRIPTION OF RELATED ART

In some cases, library programs for sound processing apparatuses are designed for a processor to be provided in a sound processing apparatus. As an example of the library programs, Japanese Patent Application Laid-Open Publication No. 2001-075758 discloses a printer system that stores library programs to be dynamically linked for respective usable printers, and searches a library program of a printer selected by a user.

In the technology disclosed in Patent Document 1, it is required to develop a library program for each device, which takes time and effort therefor.

SUMMARY

In consideration of the above-described circumstances, the present disclosure is directed to reduction in time and effort to develop a library program for each processor.

To achieve the stated object, a recording medium according to an aspect of this disclosure is a non-transitory computer readable recording medium having recorded therein a library program executable by a main processor, the main processor being provided in a sound processing apparatus, the library program includes: a first executable code that defines steps of first processing of sound processing and that is written using an instruction set for the main processor; a second executable code that defines steps of second processing of the sound processing and that is written using an instruction set for a first processor; and a third executable code that defines the steps of the second processing of the sound processing and that is written using an instruction set for a second processor, in which the library program, when executed by the main processor provided in the sound processing apparatus, causes the main processor to: execute the first executable code; transmit, in a case where the sound processing apparatus further includes the first processor, the second executable code to the first processor, thereby setting the first processor to a state in which the first processor is capable of executing the second processing of the sound processing; and transmit, in a case where the sound processing apparatus further includes the second processor, the third executable code to the second processor, thereby setting the second processor to a state in which the second processor is capable of executing the second processing of the sound processing.

A recording medium according to another aspect of this disclosure is a non-transitory computer readable recording medium having recorded therein a library program executable by a main processor, the main processor being provided in a sound processing apparatus, the library program includes: a first executable code that defines steps of first processing of sound processing and that is written using a first instruction set for the main processor; a second executable code that defines steps of second processing of the sound processing and that is written using a second instruction set; and a third executable code that defines the steps of the second processing of the sound processing and that is written using an instruction set for a first processor, in which the library program, when executed by the main processor provided in the sound processing apparatus, causes the main processor to: execute the first executable code; execute, in a case where the main processor has the second instruction set, the second executable code; and transmit, in a case where the sound processing apparatus further includes the first processor, the third executable code to the first processor, thereby setting the first processor to a state in which the first processor is capable of executing the second processing of the sound processing.

A sound processing apparatus according to another aspect of this disclosure includes: a main processor; and a storage that stores therein a library program that is executable by the main processor, in which: the library program includes: a first executable code that defines steps of first processing of sound processing and that is written using an instruction set for the main processor; a second executable code that defines steps of second processing of the sound processing and that is written using an instruction set for a first processor; and a third executable code that defines the steps of the second processing of the sound processing and that is written using an instruction set for a second processor, and in which the library program, when executed by the main processor provided in the sound processing apparatus, causes the main processor to: execute the first executable code; transmit, in a case where the sound processing apparatus further includes the first processor, the second executable code to the first processor, thereby setting the first processor to a state in which the first processor is capable of executing the second processing of the sound processing; and transmit, in a case where the sound processing apparatus further includes the second processor, the third executable code to the second processor, thereby setting the second processor to a state in which the second processor is capable of executing the second processing of the sound processing.

BRIEF DESCRIPTION OF THE DRAWINGS

FIG. 5 is a functional block diagram of the sound processing apparatus 100a;

FIG. 16 is a flowchart illustrating dynamic linking processing to the sound processing library 153c.

DESCRIPTION OF THE EMBODIMENTS

First Embodiment

Figure 1:
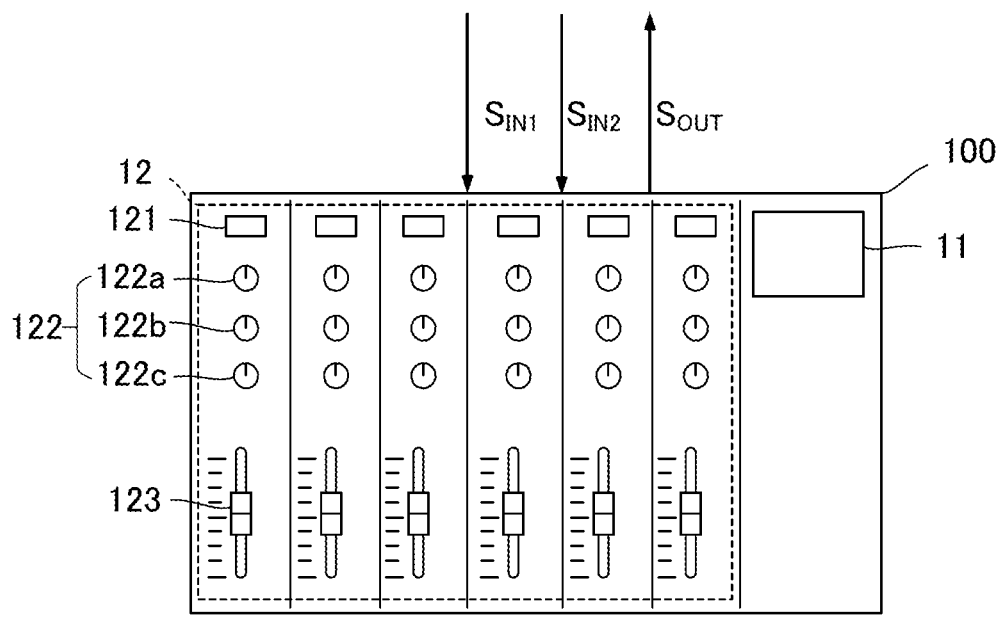
FIG. 1 is a plan view illustrating an appearance of a sound processing apparatus 100 according to a first embodiment of the present disclosure.

FIG. 1 is a plan view illustrating an appearance of a sound processing apparatus 100 according to a first embodiment of the present disclosure. The sound processing apparatus 100 is a sound mixer that includes multiple channels. Examples of the channels include sound collected by a microphone, sound generated by an electric stringed instrument, such as an electric guitar and sound generated by an electric musical instrument, such as an electric organ. The sound processing apparatus 100 mixes sounds of the channels. In the description of the sound processing apparatus illustrated in FIG. 1, to simplify the description, two channels will be exemplified, one of which is a channel (referred to as a first channel) that corresponds to a sound signal $S_{in1}$, and the other one of which is a channel (referred to as a second channel) that corresponds to a sound signal $S_{in2}$. The sound signal $S_{in1}$ may represent a sound collected by a microphone. The sound signal $S_{in2}$ may represent a sound generated by an electric stringed instrument. Which channel corresponding to which sound may be freely selected. The sound processing apparatus 100 receives the sound signals $S_{in1}$ and $S_{in2}$, and outputs a sound obtained by mixing both as an output signal $S_{out}$ to a sound outputting device (e.g., a speaker and a headphone). In the following description, as long as the sound signals $S_{in1}$ and $S_{in2}$ are not distinguished, both are referred to as sound signals $S_{in}$. The sound signals $S_{in}$ and the output signal $S_{out}$ are analog.

The sound processing apparatus 100 executes sound processing on each of the sound signals $S_{in}$ of the channels. The sound processing includes sound signal processing and processing relating to parameters used in the sound signal processing. The sound signal processing is one example of "second processing". The sound signal processing according to the present disclosure includes (i) processing to adjust sound quality of a sound signal and (ii) mixing processing to mix sound signals of channels. Examples of the processing labeled (i) include processing to adjust frequency characteristics of the sound signal, specifically, filter processing and equalizer processing.

The filter processing will be described. The filter processing refers to processing to reduce a component of a certain frequency in each of the sound signals $S_{in}$ of the channels. Examples of the filter processing include high pass filter (HPF) processing to reduce components of frequencies lower than a cutoff frequency, and low pass filter (LPF) processing to reduce components of frequencies higher than the cutoff frequency. In the first embodiment, the sound processing apparatus 100 executes the HPF processing as the filter processing.

The equalizer processing will be described. In the equalizer processing, all frequency band of each of the sound signals $S_{in}$ are divided into multiple bands. In this disclosure, the frequency band of each of the sound signals $S_{in}$ is divided into the following three: a low frequency band, an intermediate frequency band and a high frequency band. The equalizer processing refers to processing to increase and decrease volume in a desired frequency band from among these frequency bands included in each of the sound signals $S_{in}$ of the channels in response to an instruction by a user. The mixing processing refers to processing to mix each of the sound signals $S_{in}$ of the channels at mixing rates (a ratio of each sound signals to the output signal) instructed by the user.

The sound processing apparatus 100 includes a display device 11 and a console 12. The display device 11 displays various kinds of images to the user. The display device 11 is, for example a liquid crystal display or an organic electroluminescent (EL) display.

The console 12 receives an instruction from the user. The console 12 includes, for one channel, one HPF button 121, three equalizer knobs 122, and one fader 123. Some operators regarding the first channel will be described below. The HPF button 121 is for setting ON or OFF of the HPF to the first sound signals $S_{in1}$. The equalizer knobs 122 are rotary knobs that adjust a gain of a desired frequency band from among the frequency bands constituting of the sound signal $S_{in1}$ of the first channel. The three equalizer knobs 122 for the first channel illustrated in FIG. 1 include a first knob 122a, a second knob 122b and a third knob 122c. The first knob 122a is for adjusting a gain of the low frequency band. The second knob 122b is for adjusting a gain of the intermediate frequency band. The third knob 122c is for adjusting a gain of the high frequency band. The fader 123 is for adjusting mixing rates of the sound signals $S_{in1}$.

Figure 2:
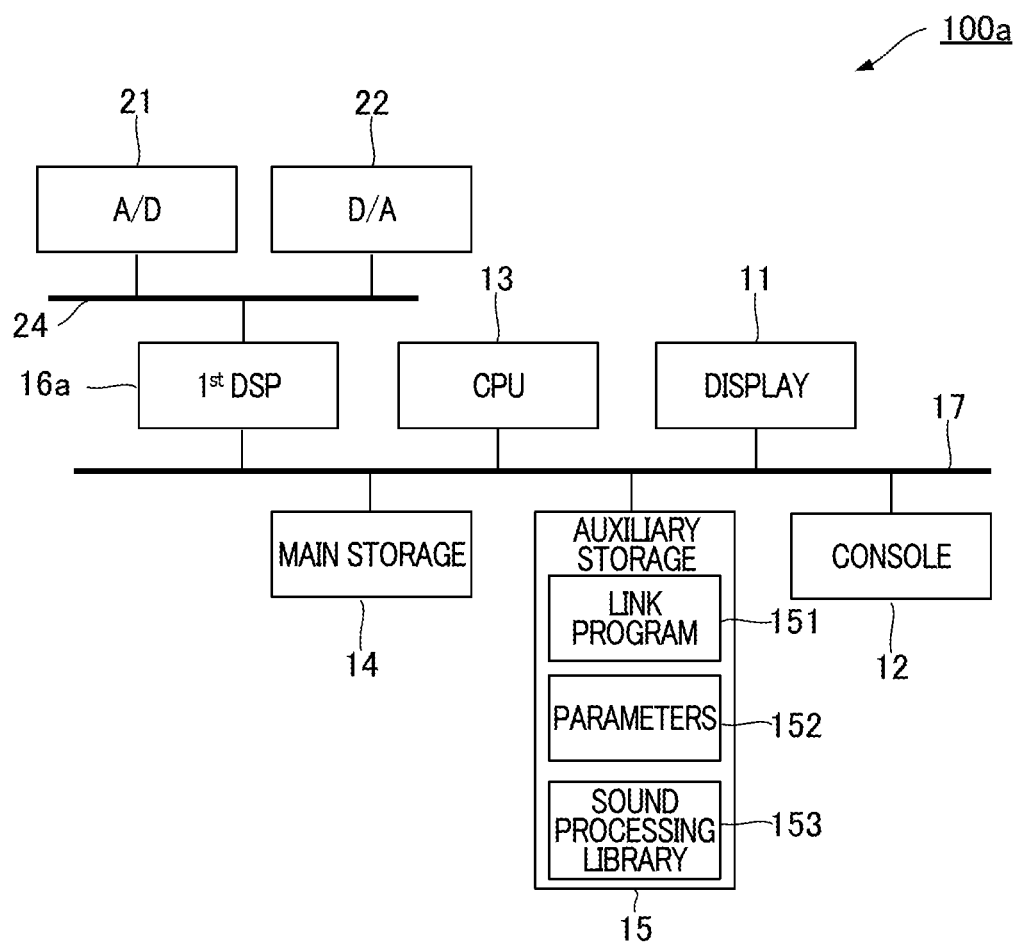
FIG. 2 is a block diagram illustrating a sound processing apparatus 100a including a first configuration.
Figure 3:
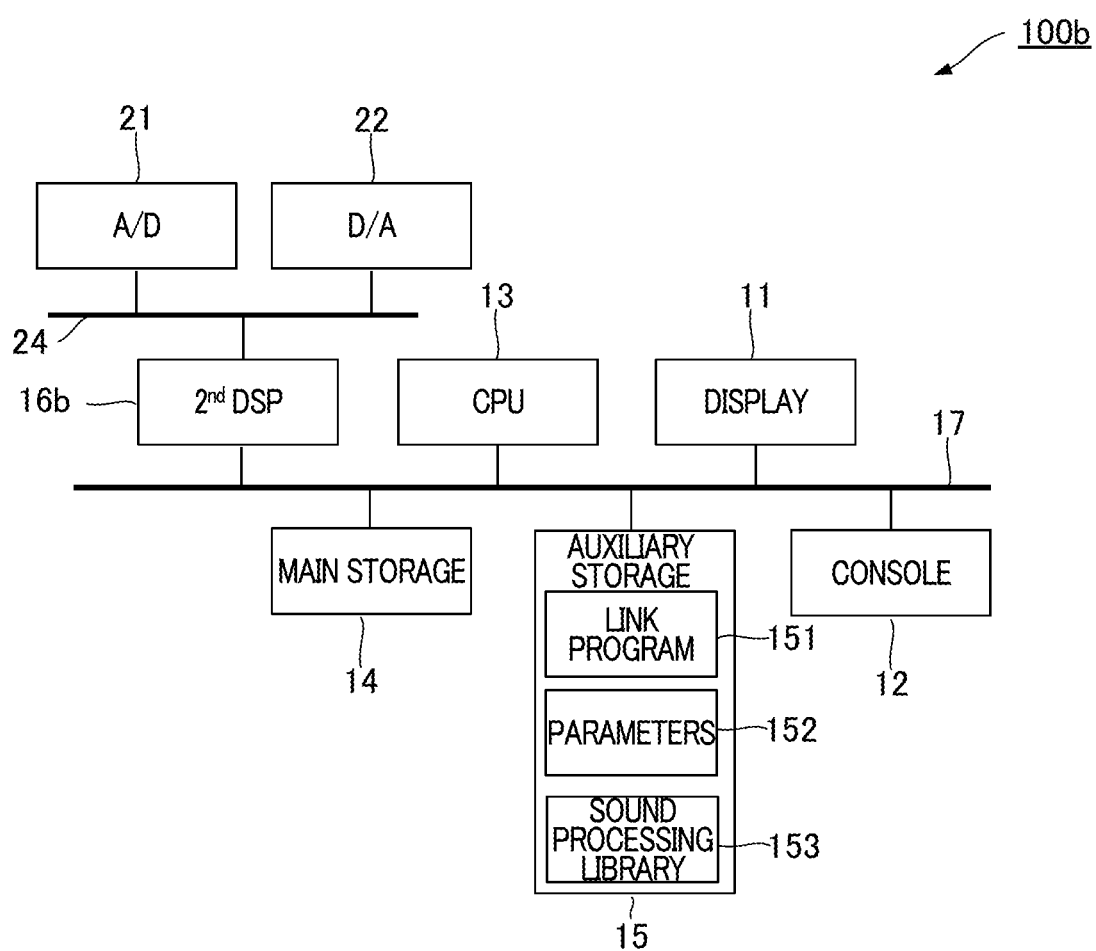
FIG. 3 is a block diagram illustrating a sound processing apparatus 100b including a second configuration.

For example, there are two types of configurations described below as the configuration of the sound processing apparatus 100. FIG. 2 illustrates a sound processing apparatus 100a including a first configuration, and FIG. 3 illustrates a sound processing apparatus 100b including a second configuration.

FIG. 2 is a block diagram illustrating the sound processing apparatus 100a including the first configuration. The sound processing apparatus 100a includes a central processing unit (CPU) 13, a main storage device 14, an auxiliary storage device 15, a first digital signal processor (DSP) 16a, an AD converter 21, and a DA converter 22 in addition to the display device 11 and the console 12 illustrated in FIG. 1. The CPU 13 is one example of a "main processor". The first DSP 16a is one example of a "first processor". The main storage device 14 and the auxiliary storage device 15 are examples of a "storage". The main storage device 14 is one example of a "volatile storage".

The display device 11, the console 12, the CPU 13, the main storage device 14, the auxiliary storage device 15, and the first DSP 16a access one another through a system bus 17. The system bus 17 is for accessing the CPU 13 and the other devices. The first DSP 16a, the AD converter 21, and the DA converter 22 access one another through an audio bus 24. The audio bus 24 is for transmitting sound signals.

The CPU 13 controls each of the elements of the sound processing apparatus 100a. The CPU 13 includes an instruction set. The instruction set refers to a set of instructions used by the processor. The instruction set held by the CPU 13 includes, for example, an addition instruction, a multiplication instruction, a comparison instruction, and a brunch instruction.

The main storage device 14 is a volatile storage device to/from which the CPU 13 writes and reads data. For example, a static random access memory (SRAM) or a dynamic random access memory (DRAM) is used as the main storage device 14. The auxiliary storage device 15 is a nonvolatile storage device that assists the main storage device 14. For example, a hard disk drive (HDD) or a solid state drive (SSD) is used as the auxiliary storage device 15. The auxiliary storage device 15 stores a link program 151, parameters 152, and a sound processing library 153. The link program 151 is a program dynamically linking a library program. In general, the link program 151 is a part of an operating system (OS).

A single library program does not operate as a program, the library operates as a part of the program by static linking or dynamic linking. Hereinafter, the library program is simply referred to as a "library". The static linking is a method of incorporating the library at the time of constructing an executable program. The dynamic linking is a method of writing the library in the main storage device 14 when the library is called from processing executed by the CPU 13. The process is an aggregation of data that enables execution of the program. The process includes a storage region of the main storage device 14 allocated to the process. Executable codes of the program are stored in the storage region.

The library includes a plurality types of parameters 152 on the sound signal processing (specifically, the equalizer processing and the mixing processing). These parameters 152 include the following (a) to (d) for one channel: (a) a parameter representative of a gain of the low frequency band, which is set by the user's input operation with use of the knob 122a; (b) a parameter representative of a gain of the intermediate frequency band, which is set by the user's input operation with use of the knob 122b; (c) a parameter representative of a gain of the high frequency band, which is set by the user's input operation with use of the knob 122c; and (d) the mixing rate used in the mixing processing, which is set by the user's input operation with use of any faders 123.

The sound processing library 153 is for execution of the sound processing. The sound processing library 153 is called by the dynamic linking from the process executed by the CPU 13, and is also called "a dynamic link library".

In the following description, the sound processing includes CPU sound processing, in addition to the above-described sound signal processing (e.g., filter processing and equalizer processing), which is one example of "first processing." The CPU sound processing relates to the sound processing executed by the CPU 13, and includes processing relating to the parameters (specifically, parameter conversion processing and memory management processing). Values indicated by the equalizer knobs 122, that is, parameters received by the sound processing apparatus from the user, are raw data in units such as decibels. In the parameter conversion processing, these parameters received from the user are converted into parameters interpretable by the sound processing apparatus (the first DSP 16a and the second DSP 16b). Here, the parameter conversion processing is one example of "conversion processing". The parameters received from the user is one example of "data received from user".

An exemplary case will be exemplified below in which the low frequency band is adjusted in the first channel. In the parameter conversion processing, the CPU 13 multiplies the gain of the low frequency band represented by the first knob 122a by a predetermined coefficient, thereby converting the gain into gain interpretable by the CPU 13 (the first DSP 16a and the second DSP 16b). In the following description, each of the gains after the parameter conversion processing is referred to as a "gain coefficient". Likewise, each of the mixing rates after the parameter conversion processing is referred to as a "mixing rate coefficient".

The memory management processing refers to processing to update the parameters 152 stored in the auxiliary storage device 15 in response to an instruction to the console 12 by the user. The parameters 152 may be stored in the main storage device 14. In the following, to simplify the description, the parameters 152 are assumed to be stored only in the auxiliary storage device 15. When a value indicated by any of the equalizer knobs 122 is changed by the user, the CPU 13 set a gain of the frequency band to be subjected in response to the changed value. For example, a case is assumed in which the first knob 122a that is set to a first gain is to be changed to a second gain. In this case, in the memory management processing, the CPU 13 updates the first gain with the second gain.

The AD converter 21 receives the analog sound signals $S_{in}$ of the channels from outside of the sound processing apparatus 100, converts the sound signals $S_{in}$ into digital sound signals $D_{in}$, and supplies the sound signals $D_{in}$ to the first DSP 16a. The DA converter 22 receives digital sound signals $D_{out}$ output from the first DSP 16a, converts the sound signals $D_{out}$ into analog sound signals $S_{out}$, and outputs the sound signals $S_{out}$.

The first DSP 16a refers to a processor performing the sound signal processing and includes an instruction set different from the instruction set of the CPU 13. The instruction set held by the first DSP 16a includes, for example, a product-sum operation instruction and a parallel processing instruction in order to execute the signal processing at high speed. The product-sum operation instruction is an instruction to sequentially add results of multiplication. The parallel processing instruction refers to an instruction to collectively process a plurality of pieces of data.

The first DSP 16a executes the filter processing and the equalizer processing for each of the channels. After these processing, each of the sound signals of the respective channel is adjusted in response to mixing rate of the respective sound signal $S_{in}$.

FIG. 3 is a block diagram illustrating the sound processing apparatus 100b including the second configuration. The sound processing apparatus 100b includes the CPU 13, the main storage device 14, the auxiliary storage device 15, a second DSP 16b, the AD converter 21, and the DA converter 22 in addition to the display device 11 and the console 12 illustrated in FIG. 1. The second DSP 16b is one example of a "second processor". As compared with the configuration of the sound processing apparatus 100a, the sound processing apparatus 100b includes the second DSP 16b in place of the first DSP 16a.

The second DSP 16b is a processor performing the sound signal processing. The second DSP 16b includes an instruction set that differs from the instruction set of the CPU 13 and the instruction set of the first DSP 16a. The second DSP 16b includes a product-sum operation instruction, a parallel processing instruction, and the like as with the first DSP 16a. However, even when the first DSP 16a and the second DSP 16b each have the same type of instruction, a data length of the instruction is different between the first DSP 16a and the second DSP 16b in some cases. A sign of an operation code included in the instruction is different between the first DSP 16*a* and the second DSP 16*b* in some cases. The operation code refers to a part designating the type of instruction in a bit sequence indicating the instruction.

Figure 4:
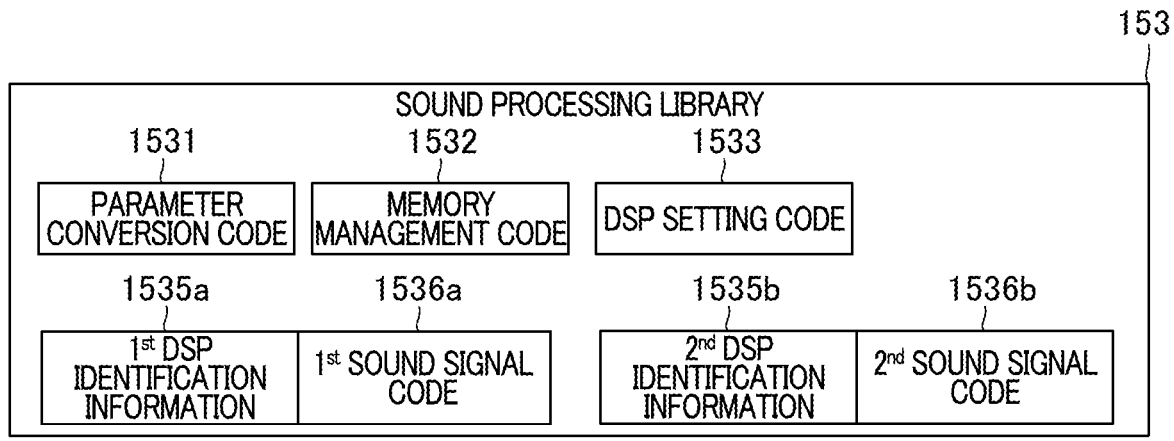
FIG. 4 is a diagram illustrating data included in a sound processing library 153.

FIG. 4 is a diagram illustrating data included in the sound processing library 153. The sound processing library 153 includes a parameter conversion code 1531, a memory management code 1532, a DSP setting code 1533, first DSP identification information 1535*a*, a first sound signal code 1536*a*, second DSP identification information 1535*b*, and a second sound signal code 1536*b*.

In the following description, in a case in which the same type of elements are distinguished from each other, subscriptions are used (e.g., the sound processing apparatus 100*a*, 100*b*). If not, the same reference numerals are used (e.g., the sound processing apparatus 100). Likewise, as long as the first DSP 16*a* and the second DSP 16*b* are not distinguished from each other, each DSP is referred to as a "DSP 16". As long as the first DSP identification information 1535*a* and the second DSP identification information 1535*b* are not distinguished from each other, each DSP identification information is referred to as "DSP identification information 1535". As long as the first sound signal code 1536*a* and the second sound signal code 1536*b* are not distinguished from each other, each sound signal code is referred to as a "sound signal code 1536".

The parameter conversion code 1531 and the memory management code 1532 are examples of a "first executable code". The first DSP identification information 1535*a* is one example of "first identification information". The first sound signal code 1536*a* is one example of a "second executable code". The second DSP identification information 1535*b* is one example of "second identification information". The second sound signal code 1536*b* is one example of a "third executable code". The first DSP 16*a* is one example of a "processor configured to execute a second executable code". The second DSP 16*b* is one example of a "processor configured to execute a third executable code".

The parameter conversion code 1531 refers to an executable code that defines steps of parameter conversion processing and is written using the instruction set held by the CPU 13. The memory management code 1532 refers to an executable code that defines steps of memory management processing and is written using the instruction set held by the CPU 13. The DSP setting code 1533 refers to an executable code that defines steps of DSP setting processing to set the DSP 16 and written using the instruction set held by the CPU 13. The DSP setting processing includes processing to instruct the first DSP 16*a* to execute the sound signal processing and processing to instruct the second DSP 16*b* to execute the sound signal processing. It is of note that the DSP setting processing is included in the above-described CPU sound processing (e.g., parameter conversion processing and memory management processing). There is a case in which a size of data as an argument of the instruction held by the DSP 16, and the type of arrangement order of the data (e.g., little-endian or big-endian) are different between the first DSP 16*a* and the second DSP 16*b*. Therefore, the setting processing is necessary for each DSP 16 in some cases. A cross compiler executed by an information processing apparatus, such as a personal computer (PC), generates the parameter conversion code 1531 by generating an executable code for the CPU 13, based on a source code that defines steps of the parameter conversion processing. The cross compiler refers to a program having a function of generating an executable code for a processor other than a processor executing the compiler. Likewise, the above-described cross compiler generates the memory management code 1532 and the DSP setting code 1533 by generating executable codes for the CPU 13, based on source codes that defines steps of the memory management processing and steps of the DSP setting processing.

The first DSP identification information 1535*a* refers to information for identification of DSPs, and indicates identification of the first DSP 16*a*. The first sound signal code 1536*a* refers to an executable code that defines steps of the sound signal processing and that is written using the instruction set held by the first DSP 16*a*. For example, the above-described cross compiler generates the first sound signal code 1536*a* by generating an executable code for the first DSP 16*a* on the bases of a source code that defines steps of the sound signal processing.

The first DSP identification information 1535*a* is associated with the first sound signal code 1536*a*. The second DSP identification information 1535*b* is associated with the second sound signal code 1536*b*. Examples of the association include two modes described below. In a first mode, when, in the sound processing library 153, the first DSP identification information 1535*a* is stored at a first address, the first sound signal code 1536*a* is stored at a second address next to the first address. In a second mode, when, in the sound processing library 153, the first sound signal code 1536*a* is stored at a first address, an offset value indicating a storage position of the first sound signal code 1536*a* is stored at a second address next to the first address. The offset value refers to the number of bytes from the head inside the sound processing library 153.

The second DSP identification information 1535*b* refers to information for identification of DSPs, and indicates a name of the second DSP 16*b*. The second sound signal code 1536*b* is an executable code that defines steps of the sound signal processing and written using the instruction set held by the second DSP 16*b*. For example, the above-described cross compiler generates the second sound signal code 1536*b* by generating an executable code for the second DSP 16*b*, based on a source code that defines steps of the sound signal processing.

Figure 5:
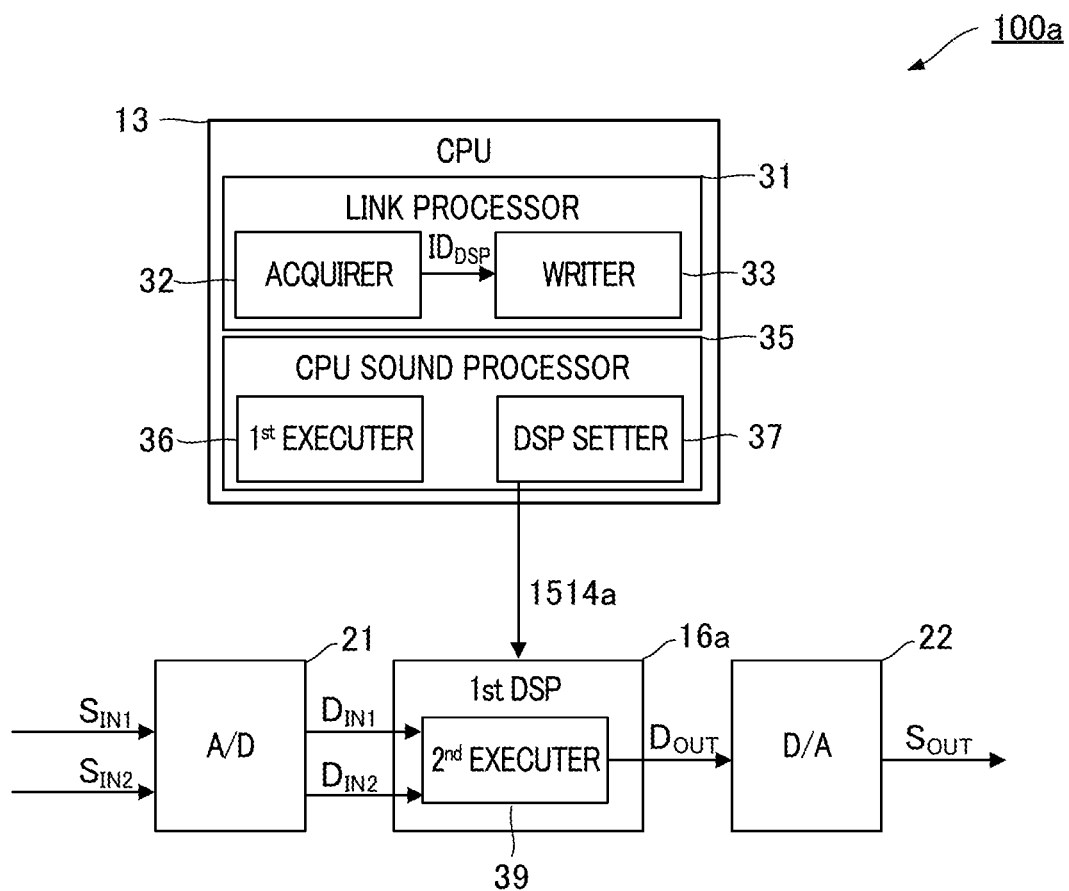

FIG. 5 is a functional block diagram of the sound processing apparatus 100*a*. Illustration of functions of the sound processing apparatus 100*b* is omitted since only the first DSP 16*a* is replaced with the second DSP 16*b*. The CPU 13 serves as a link processor 31 by reading and executing the link program 151. The link processor 31 dynamically links the sound processing library 153, and includes an acquirer 32 and a writer 33.

To call the sound processing library 153 by the dynamic linking, the acquirer 32 acquires identification information $ID_{DSP}$ on the DSP 16 of the sound processing apparatus 100. There are three options to define the identification information $ID_{DSP}$ as follows. In a first option, at a manufacturing stage of the sound processing apparatus 100, a designer (developer) thereof defines the identification information $ID_{DSP}$. In a second option, the CPU 13 accesses the DSP 16 in the sound processing apparatus 100, and generates identification information acquired from the DSP 16 as the identification information $ID_{DSP}$. That is, the sound processing apparatus 100 itself defines the identification information $ID_{DSP}$. In a third option, after the shipment of the sound processing apparatus 100, an end user defines the identification information $ID_{DSP}$ by operating the console 12. The defined identification information $ID_{DSP}$ is stored in the auxiliary storage device 15.

The writer 33 writes, in the main storage device 14, the parameter conversion code 1531, the memory management code 1532, the DSP setting code 1533, and an executable code associated with the DSP identification information 1535 having the same contents as the contents of the identification information $ID_{DSP}$ acquired by the acquirer 32 out of the first sound signal code 1536a and the second sound signal code 1536b. As illustrated in FIG. 5, the sound processing apparatus 100a is employed for the sound processing apparatus 100. Therefore, the writer 33 writes the parameter conversion code 1531, the memory management code 1532, the DSP setting code 1533, and the first sound signal code 1536a in the main storage device 14. In a case in which the sound processing apparatus 100b is employed for the sound processing apparatus, the writer 33 writes the parameter conversion code 1531, the memory management code 1532, the DSP setting code 1533, and the second sound signal code 1536b in the main storage device 14.

Figure 6:
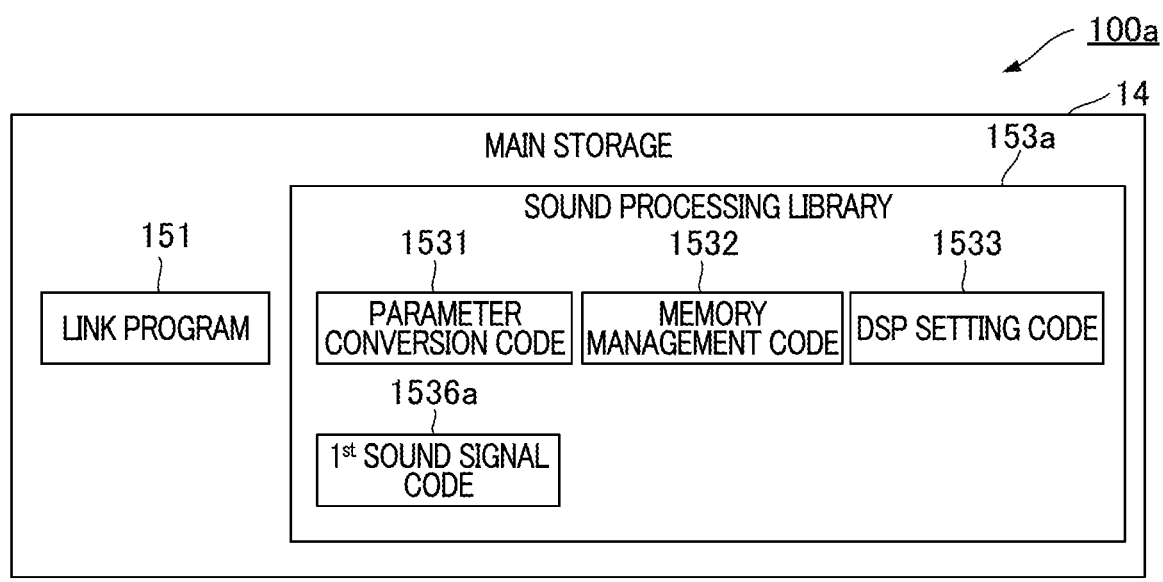
FIG. 6 is a diagram illustrating contents stored in a main storage device 14 after processing by a writer 33.

FIG. 6 is a diagram illustrating contents stored in the main storage device 14 after the processing by the writer 33. The main storage device 14 stores the link program 151 and a sound processing library 153a. The sound processing library 153a includes the parameter conversion code 1531, the memory management code 1532, the DSP setting code 1533, and the first sound signal code 1536a. In other words, the sound processing library 153a does not include the first DSP identification information 1535a, the second DSP identification information 1535b, and the second sound signal code 1536b.

Referring back to FIG. 5, the CPU 13 serves as a CPU sound processor 35 by reading and executing the parameter conversion code 1531, the memory management code 1532, and the DSP setting code 1533 that have been written in the main storage device 14 by the writer 33. The CPU sound processor 35 executes the CPU sound processing. The CPU sound processor 35 includes a first executer 36 and a DSP setter 37. The DSP setter 37 is one example of a "setter".

The first executer 36 executes the parameter conversion code 1531 and the memory management code 1532. The first executer 36 transmits, to the first DSP 16a, data obtained by the parameter conversion processing.

The first executer 36 executes the parameter conversion code 1531 and the memory management code 1532 irrespective of whether the sound processing apparatus 100 includes the first DSP 16a or the second DSP 16b.

As illustrated in FIG. 5, the sound processing apparatus 100 includes the first DSP 16a. Therefore, the DSP setter 37 transmits the first sound signal code 1536a to the first DSP 16a, thereby setting the first DSP 16a to a state in which the first DSP 16a executes the sound signal processing. In a case in which the sound processing apparatus 100 includes the second DSP 16b, the DSP setter 37 transmits the second sound signal code 1536b to the second DSP 16b, thereby setting the second DSP 16b to a state in which the second DSP 16b executes the sound signal processing. In addition, the DSP setter 37 instructs the DSP 16 to execute the sound signal processing.

As illustrated in FIG. 5, the first DSP 16a serves as a second executer 39 by reading and executing the first sound signal code 1536a.

The second executer 39 will be described below. In this description, a case is exemplified in which one HPF button corresponding to any channel (e.g., the first channel) is pressed from among the HPF buttons 121. The second executer 39 executes, as the sound signal processing, the HPF processing, the equalizer processing, and the mixing processing. As for the equalizer processing, the second executer 39 uses the gain coefficients of the respective frequency bands converted by the parameter conversion processing. As for the mixing processing, the second executer 39 uses the mixing rate coefficients converted by the parameter conversion processing.

The HPF processing and the equalizer processing include, for example, two modes described below. In a first mode, the second executer 39 executes fast Fourier transform processing on the sound signals $D_{in}$ and acquires components of the frequency bands (the low frequency band, the intermediate frequency band and the high frequency band). The instruction set held by the DSP 16 includes an instruction to efficiently execute processing specific to the fast Fourier transform processing in some cases. The second executer 39 processes the components of the frequency bands (the low frequency band, the intermediate frequency band and the high frequency band) with use of the data converted by the parameter conversion processing, and outputs a result obtained by performing inverse fast Fourier transform processing as the sound signal $D_{out}$.

In a second mode, the first DSP 16a duplicates the sound signals $D_{in}$ by the number of divided frequency bands in the equalizer processing. In this disclosure, the number is the following three: a low frequency band, an intermediate frequency band and a high frequency band, and therefore three sound signals $D_{in}$ are generated. In addition, the first DSP 16a has three different bandpass filters for extracting these frequency bands. The first DSP 16a applies bandpass filters to the duplicated sound signals $D_{in}$, thereby extracting the components of these frequency bands. The original (prior to the duplication) sound signal $D_{in}$ may be discarded. The first DSP 16a processes the components of the frequency bands (the low frequency band, the intermediate frequency band and the high frequency band) with use of the data converted by the parameter conversion processing, combines the processed components of the frequency bands, and outputs a result of combining them, as the sound signal $D_{out}$.

As for the mixing processing, the first DSP 16a outputs, as the sound signal $D_{out}$, a result obtained by mixing the sound signal $D_{in1}$ and the sound signal $D_{in2}$, based on the mixing rate coefficient of the sound signal $S_{in1}$ and the mixing rate coefficient of the sound signal $S_{in2}$ that are converted by the parameter conversion processing.

Operation of the sound processing apparatus 100 is described with reference to FIG. 7 to FIG. 9.

Figure 7:
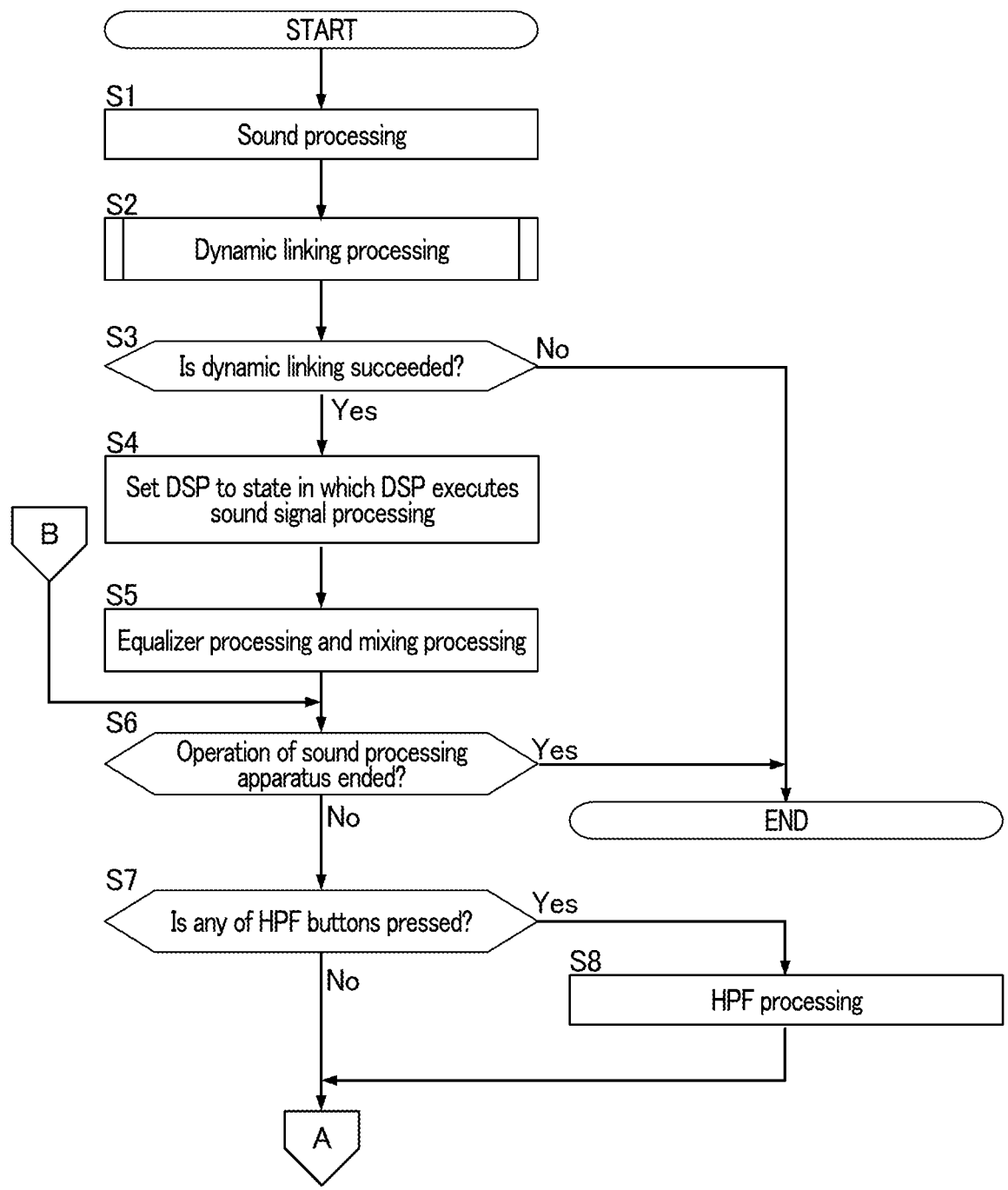
FIG. 7 is a first flowchart illustrating operation of the sound processing apparatus 100.
Figure 8:
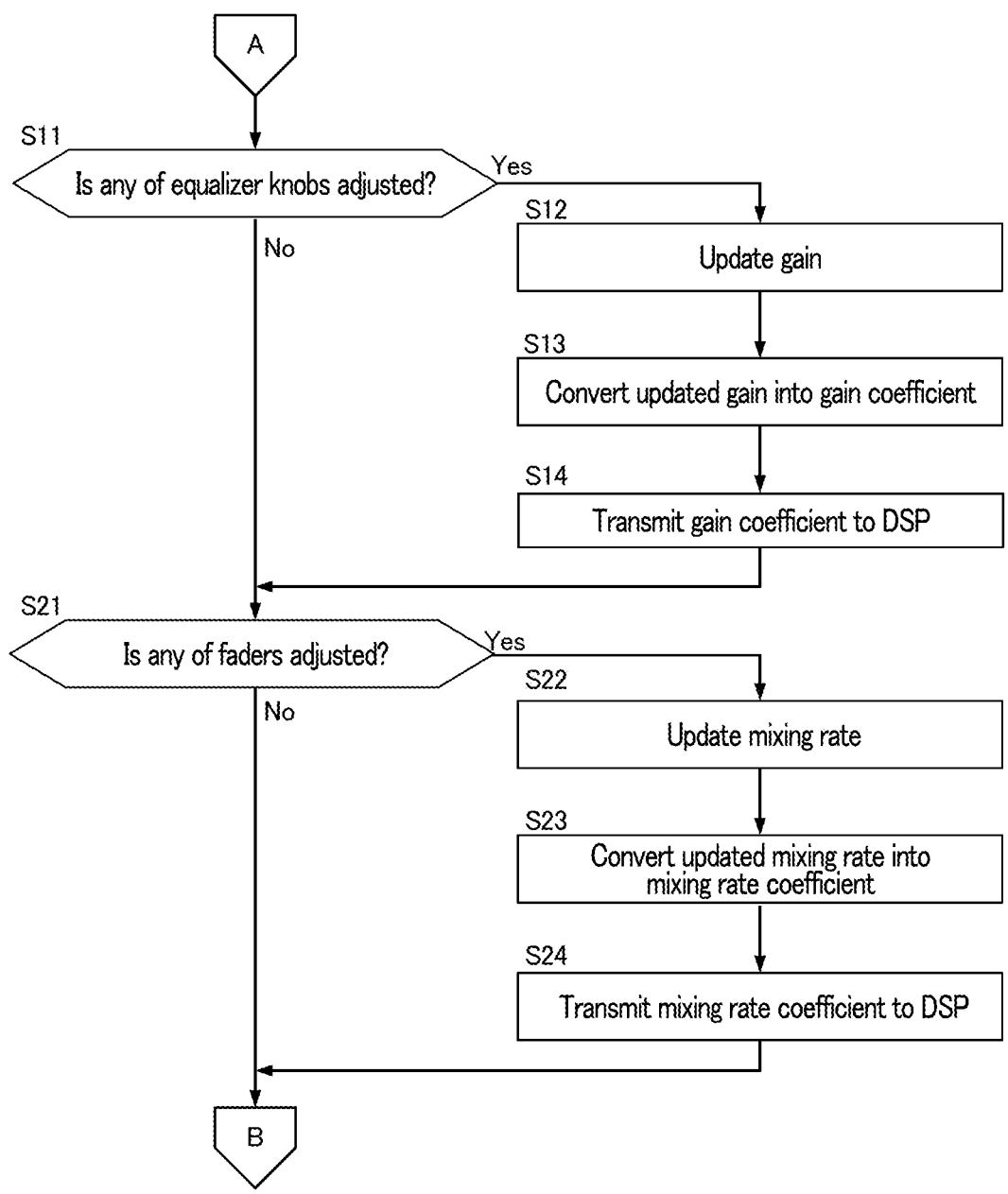
FIG. 8 is a second flowchart illustrating the operation of the sound processing apparatus 100.

FIG. 7 and FIG. 8 are flowcharts illustrating the operation of the sound processing apparatus 100. The flowcharts illustrated in FIG. 7 and FIG. 8 are executed in response to power-on of the sound processing apparatus 100 and activation completion of the OS. Since the activation of the OS is completed, the link program 151 that is a part of the OS has been read. Therefore, the CPU 13 serves as the link processor 31.

In step S1, the CPU 13 executes a sound processing process. The sound processing process refers to a process to call the sound processing library 153 by the dynamic linking. When the sound processing process calls the sound processing library 153 by the dynamic linking, the link processor 31 executes dynamic linking processing on the sound processing library 153 in step S2.

The sound processing process calls the sound processing library 153 by the dynamic linking at the following two timings. One of the two timings is when the sound processing process is activated. The other one of the timings is when the CPU 13 executes a function to call the sound processing library, in the executable code included in the sound processing process.

Figure 9:
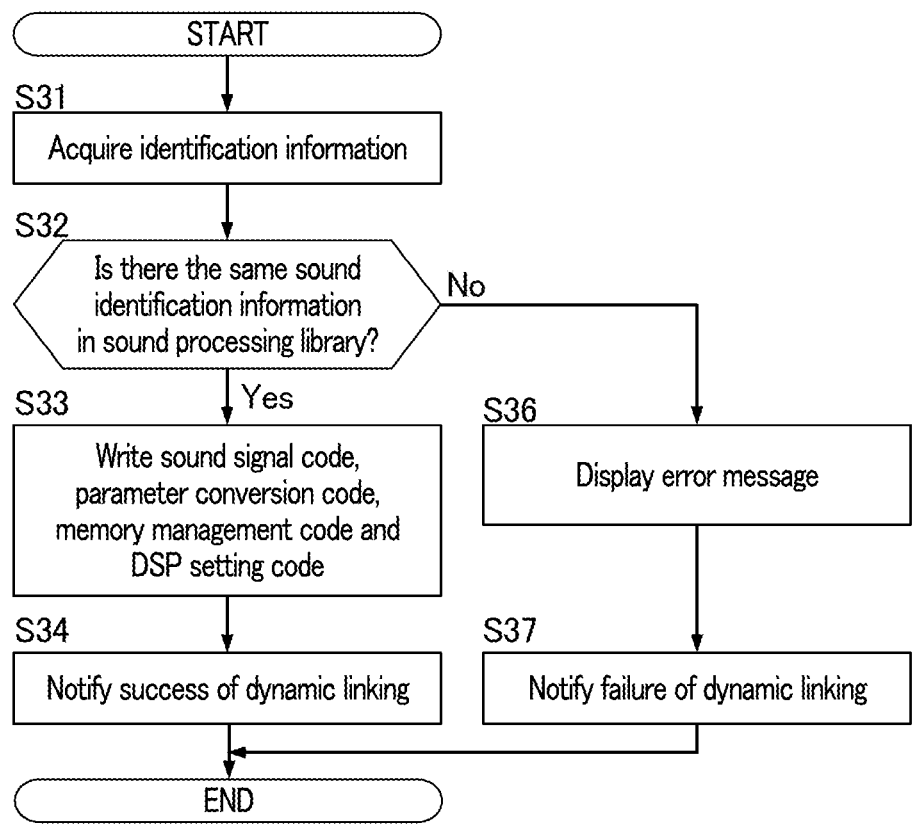
FIG. 9 is a flowchart illustrating dynamic linking processing to the sound processing library 153.

FIG. 9 is a flowchart illustrating the dynamic linking processing to the sound processing library 153. In step S31, the acquirer 32 acquires the identification information $ID_{DSP}$ on the DSP 16 of the sound processing apparatus 100. Next, in step S32, the acquirer 32 determines whether the sound processing library 153 stored in the auxiliary storage device 15 includes the DSP identification information 1535 having contents that are the same as the contents of the identification information $ID_{DSP}$. When the sound processing library 153 includes the DSP identification information 1535 having contents that are the same as the contents of the identification information $ID_{DSP}$ (Yes in step S32), the writer 33 writes the sound signal code 1536 corresponding to the DSP identification information 1535 having the same contents, the parameter conversion code 1531, the memory management code 1532, and the DSP setting code 1533 in the main storage device 14 in step S33. The CPU 13 serves as the link processor 31 and the CPU sound processor 35 by the processing in step S33. In step S34 after the end of processing in step S33, the link processor 31 outputs a notification indicating success of the dynamic linking. The series of processing illustrated in FIG. 9 then ends.

When the sound processing library 153 does not include the DSP identification information 1535 having contents that are the same as the contents of the identification information $ID_{DSP}$ (No in step S32), the link processor 31 displays a message (an error message) indicating that the sound signal processing is not performable, on the display device 11 in step S36. Next, in step S37, the link processor 31 outputs notification indicating failure of the dynamic linking. The series of processing illustrated in FIG. 9 then ends.

Referring back to FIG. 7, in step S3, the link processor 31 determines whether the dynamic linking has succeeded. When the dynamic linking has failed (No in step S3), the sound processing apparatus 100 terminates the series of processing illustrated in FIG. 7 and FIG. 8.

In contrast, when the dynamic linking has succeeded (Yes in step S3), the DSP setter 37 transmits, in step S4, the sound signal code 1536 to the DSP 16 to set the DSP 16 to a state in which the DSP 16 executes the sound signal processing. Next, in step S5, the DSP setter 37 instructs the DSP 16 to execute the equalizer processing and the mixing processing of the sound signal processing. More specifically, the first executer 36 converts the gains included in the parameters 152 into coefficients interpretable by the DSP 16. The DSP setter 37 transmits the gain coefficients to the DSP 16. The DSP 16 executes the equalizer processing using the received gain coefficients. Furthermore, the first executer 36 converts the mixing rates included in the parameters 152 into mixing rate coefficients interpretable by the DSP 16. Thereafter, the DSP setter 37 transmits the mixing rate coefficients to the DSP 16. The DSP 16 executes the mixing processing using the received mixing rate coefficients.

In step S6 after end of the processing in step S5, the CPU 13 determines whether an instruction to terminate the operation of the sound processing apparatus 100 has been received. For example, in a case in which a power button (not shown in FIG. 1) is set to OFF, the CPU 13 determines that the instruction to terminate the operation of the sound processing apparatus 100 has been received. When the instruction to terminate the operation of the sound processing apparatus 100 has been received (Yes in step S6), the sound processing apparatus 100 terminates the series of processing illustrated in FIG. 7 and FIG. 8.

When the instruction to terminate the operation of the sound processing apparatus 100 has not been received (No in step S6), the CPU sound processor 35 determines in step S7 whether pressing operation of any of the HPF buttons 121 has been received. When the pressing operation of any of the HPF buttons 121 has been received (Yes in step S7), the DSP setter 37 transmits, in step S8, an instruction to execute the HPF processing to the DSP 16. The DSP 16 executes the HPF processing on the corresponding sound signal $S_{in}$ input after receiving the instruction to execute the HPF processing.

After end of the processing in step S8 or in a case in which the pressing operation of all of the HPF buttons 121 has not been received (No in step S7), the CPU sound processor 35 determines in step S11 whether a value indicated by any of the equalizer knobs 122 has been changed. When a value indicated by any of the equalizer knobs 122 has been changed (Yes in step S11), the first executer 36 updates, in step S12, the corresponding gain included in the parameters 152 with a gain indicated by the changed equalizer knob 122. Next, in step S13, the first executer 36 converts the updated gain into a gain coefficient interpretable by the DSP 16. Thereafter, in step S14, the DSP setter 37 transmits the converted gain coefficient to the DSP 16. The DSP 16 executes the equalizer processing using the received gain coefficient, on the corresponding sound signal $S_{in}$ input after receiving the gain.

After the end of processing in step S14 or in a case in which a value indicated by each of the equalizer knobs 122 is not changed (No in step S11), the CPU sound processor 35 determines in step S21 whether the position of any of the faders 123 has been changed. When the position of any of the faders 123 has been changed (Yes in step S21), the first executer 36 updates, in step S22, the corresponding mixing rate included in the parameters 152 with a mixing rate indicated by the fader 123 changed in position. Next, in step S23, the first executer 36 converts the updated mixing rate into a mixing rate coefficient interpretable by the DSP 16. Thereafter, in step S24, the DSP setter 37 transmits the converted mixing rate coefficient to the DSP 16. The DSP 16 executes the mixing processing using the received mixing rate coefficient, on the sound signal $S_{in}$ of the channels input after receiving the mixing rate coefficient.

After the end of processing in step S24 or in a case in which the positions of all of the faders 123 have not been changed (No in step S21), the processing of the CPU sound processor 35 proceeds to processing in step S6.

As described above, in the first embodiment, the parameter conversion code 1531 and the memory management code 1532 are used in common in both of the following cases: a case in which the sound processing apparatus 100 includes the first DSP 16a; and a case in which the sound processing apparatus 100 includes the second DSP 16b. Accordingly, as compared with a case in which the parameter conversion code 1531 and the memory management code 1532 are not used in common, it is possible to reduce time and effort for developing the sound processing library 153.

In the first embodiment, the first executer 36 executes the parameter conversion code 1531 and the memory management code 1532 irrespective of whether the sound processing apparatus 100 includes the first DSP 16a or the second DSP 16b. In other words, the parameter conversion code 1531 and the memory management code 1532 are used in common even in the case in which the sound processing apparatus 100 is the sound processing apparatus 100a or even in the case in which the sound processing apparatus 100 is the sound processing apparatus 100b. This makes it possible to reduce the time and effort of developing the sound processing library 153.

In the first embodiment, the sound processing library 153 is a dynamic link library. According to the above-described configuration, for example, a developer of the sound processing apparatus 100 is not required to register the plurality of sound processing libraries 153 on a web site. Therefore, the user can store one sound processing library 153 registered at the web site in the sound processing apparatus 100 without considering whether the sound processing library 153 is appropriate for the configuration of the sound processing apparatus 100 owned by the user. This improves convenience. If the sound processing library 153 is a static link library, the sound processing library 153 includes the sound signal codes 1536 for respective DSPs 16. Therefore, the link program operating in the information processing apparatus and the like cannot be linked as is, and the link program requires designation of the identification information on the DSP 16 as an option. A program acquired by execution of the link program is a program corresponding to one type of the DSP 16. Therefore, it is necessary for the developer to register the programs for the respective DSPs 16 on the web site. It is necessary for the user to select a program appropriate to the configuration of the sound processing apparatus 100 owned by the user from the programs for the respective DSPs 16. This decreases convenience. Furthermore, in the case in which the sound processing library 153 is the dynamic link library, it is necessary to update only the sound processing library 153 in order to update the sound processing library 153. In contrast, in the case in which the sound processing library 153 is the static link library, it is necessary to update the entirety of the program linked with the sound processing library in order to update the sound processing library 153.

In the first embodiment, the CPU sound processing includes the parameter conversion processing, and the sound signal processing includes the HPF processing, the equalizer processing, and the mixing processing. Accordingly, the CPU 13 executes the parameter conversion processing and the DSP 16 executes the HPF processing, the equalizer processing, and the mixing processing, which makes it possible to distribute the loads.

In the first embodiment, the CPU sound processing includes the memory management processing that updates the parameters 152 in response to the instruction to the console 12 by the user. The parameter conversion processing converts the parameter updated by the memory management processing into a parameter interpretable by the DSP. Accordingly, when update of the parameter is instructed by the user, the sound processing apparatus 100 can execute the equalizer processing and the mixing processing using the updated parameter.

In the first embodiment, the writer 33 writes either of the first sound signal code 1536a and the second sound signal code 1536b in the main storage device 14 and does not write the other executable code. Accordingly, as compared with a case in which the other executable code is also written in the main storage device 14, the sound processing apparatus 100 can minimize usage of the main storage device 14.

Second Embodiment

A sound processing apparatus 100 according to a second embodiment is different from the sound processing apparatus 100 according to the first embodiment in that the sound processing apparatus 100 according to the second embodiment may include a third configuration not provided with the DSP 16, in addition to the first configuration and the second configuration. In the second embodiment illustrated below, an element having action or a function equivalent to the action or the function of the element in the first embodiment is denoted by the same reference numeral in the above description, and detailed description of such an element is omitted as appropriate.

Figure 10:
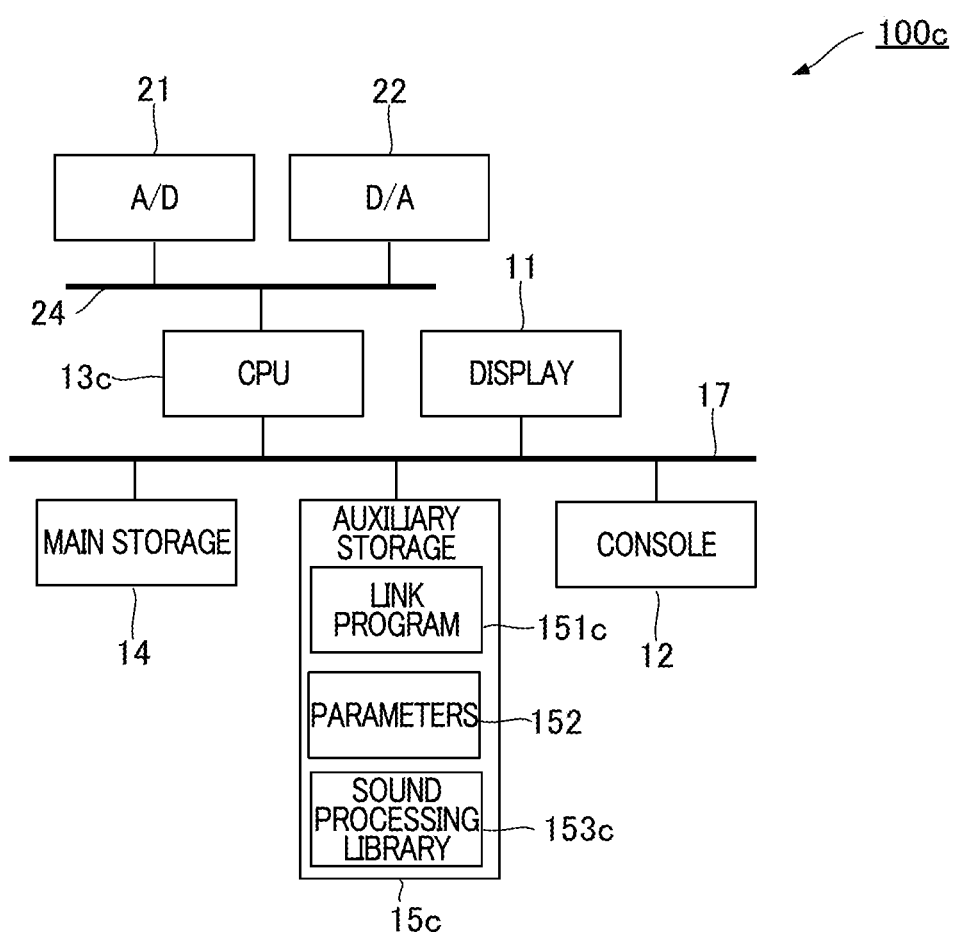
FIG. 10 is a block diagram illustrating a sound processing apparatus 100c including a third configuration.

FIG. 10 is a block diagram illustrating a sound processing apparatus 100c including the third configuration. The sound processing apparatus 100c includes the display device 11, the console 12, a CPU 13c, the main storage device 14, an auxiliary storage device 15c, the AD converter 21, and the DA converter 22. The CPU 13c, the AD converter 21, and the DA converter 22 access one another through the audio bus 24. As compared with the configuration of the sound processing apparatus 100a and the configuration of the sound processing apparatus 100b, the sound processing apparatus 100c does not include the DSP 16.

The CPU 13c controls the elements of the sound processing apparatus 100c. The CPU 13c includes a basic instruction set including basic instructions and an extended instruction set including extended instructions. The basic instruction set is one example of a "first instruction set". The extended instruction set is one example of a "second instruction set".

More specifically, the basic instruction set refers to a set of instructions each singly processing a single piece of data. The instruction set held by the CPU 13 according to the first embodiment corresponds to the basic instruction set. The extended instruction set includes a product-sum operation instruction and a parallel processing instruction. The product-sum operation instruction is an example of instructions to execute a plurality of calculations by a single instruction. The parallel processing instruction is an example of instructions to execute a plurality of calculations at the same time by a single instruction.

In the following description, the CPU 13 according to the first embodiment, namely, the CPU 13 not including the extended instruction set is referred to as a "CPU 13a". When the CPU 13a and the CPU 13c are not distinguished from each other, each CPU is referred to as a "CPU 13".

The auxiliary storage device 15c stores a link program 151c, the parameters 152, and a sound processing library 153c. The link program 151c dynamically links a library. The sound processing library 153c refers to a library that is read to enable the sound processing.

Figure 11:
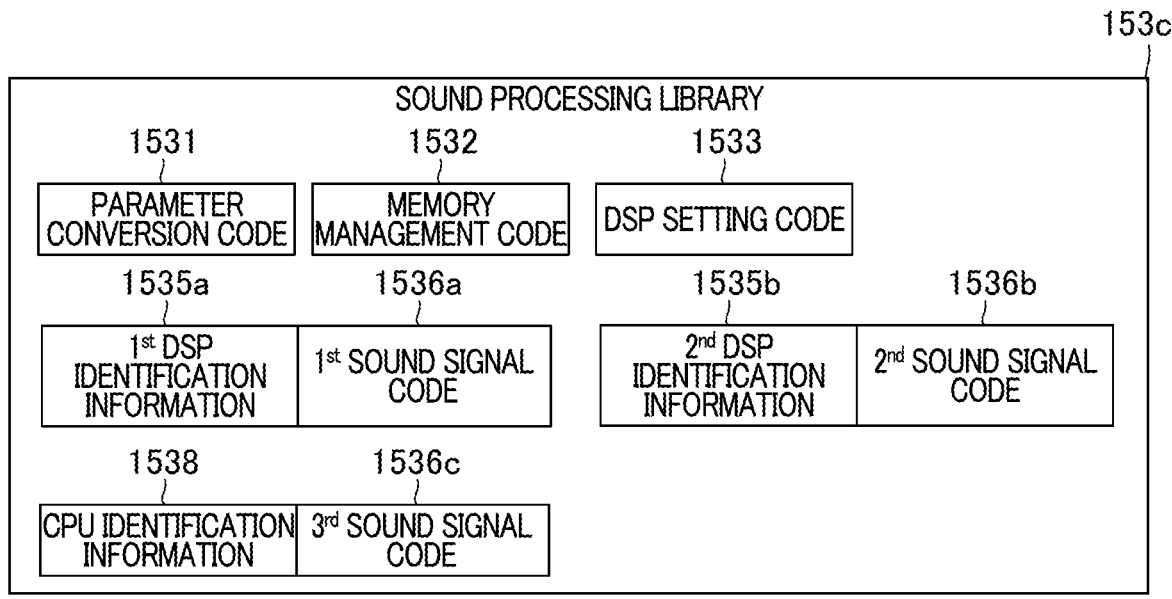
FIG. 11 is a diagram illustrating data included in a sound processing library 153c.

FIG. 11 is a diagram illustrating data included in the sound processing library 153c. The sound processing library 153c includes CPU identification information 1538 and a third sound signal code 1536c in addition to the data included in the sound processing library 153. The third sound signal code 1536c is one example of a "second executable code that defines steps of second instruction set". The first sound signal code 1536a and the second sound signal code 1536b are examples of a "third executable code that defines steps of the second processing". In the second embodiment, the DSP 16 is one example of a "processor".

The CPU identification information 1538 is for identification of the CPU 13. The CPU identification information 1538 indicates, for example, a name of a type of the CPU 13. The CPU identification information 1538 is associated with the third sound signal code 1536c.

The third sound signal code 1536c refers to an executable code that defines steps of the sound signal processing and is written using the extended instruction set. The third sound signal code 1536c, however, may include an instruction included in the basic instruction set. For example, the above-described cross compiler generates the third sound signal code 1536c by generating an executable code for the CPU 13c including the extended instruction set, based on a source code that defines steps of the sound signal processing.

Figure 12:
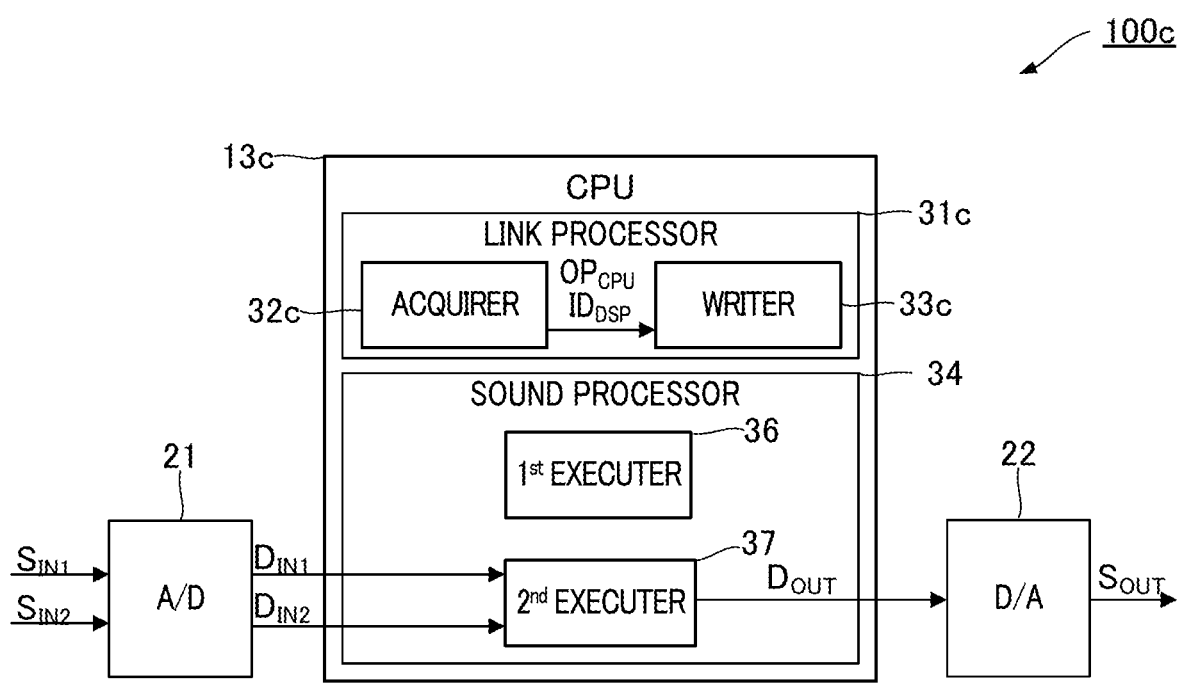
FIG. 12 is a diagram illustrating functions of the sound processing apparatus 100c.

FIG. 12 is a diagram illustrating functions of the sound processing apparatus 100c. The CPU 13c serves as a link processor 31c by reading and executing the link program 151c. The link processor 31c dynamically links the sound processing library 153c. The link processor 31c includes an acquirer 32c and a writer 33c.

To call the sound processing library 153c by the dynamic linking, the acquirer 32c acquires instruction presence or absence information $OP_{CPU}$ representing whether the CPU 13 of the sound processing apparatus 100 includes the extended instruction set. Furthermore, when the CPU 13 of the sound processing apparatus 100 does not include the extended instruction set, the acquirer 32c acquires the identification information $ID_{DSP}$ on the DSP 16 of the sound processing apparatus 100. For example, when the sound processing apparatus 100 is the sound processing apparatus 100c, the acquirer 32c acquires the information $OP_{CPU}$ representing that the CPU 13 includes the extended instruction set.

The writer 33c refers to the information $OP_{CPU}$. When the CPU 13 of the sound processing apparatus 100 includes the extended instruction set, the writer 33c writes the parameter conversion code 1531, the memory management code 1532, and the third sound signal code 1536c associated with the CPU identification information 1538 in the main storage device 14.

When the CPU 13 of the sound processing apparatus 100 does not include the extended instruction set, the writer 33c writes, in the main storage device 14, the parameter conversion code 1531, the memory management code 1532, the DSP setting code 1533, and the sound signal code 1536 associated with the DSP identification information 1535 having contents that are the same as the contents of the identification information $ID_{DSP}$ acquired by the acquirer 32 out of the first sound signal code 1536a and the second sound signal code 1536b.

Figure 13:
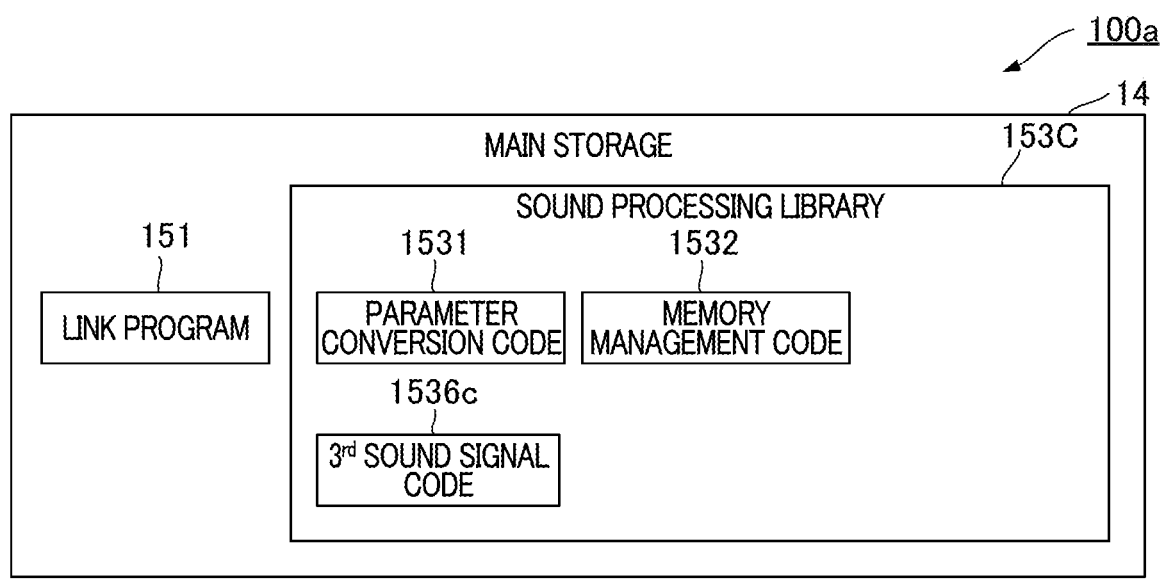
FIG. 13 is a diagram illustrating contents stored in the main storage device 14 after processing by a writer 33c.

FIG. 13 is a diagram illustrating contents stored in the main storage device 14 after the processing by the writer 33c. The main storage device 14 stores thereon the link program 151 and a sound processing library 153C. The sound processing library 153C includes the parameter conversion code 1531, the memory management code 1532, and the third sound signal code 1536c. In other words, the sound processing library 153C does not include the DSP setting code 1533, the first DSP identification information 1535a, the first sound signal code 1536a, the second DSP identification information 1535b, and the second sound signal code 1536b.

Referring back to FIG. 12, the CPU 13c serves as the sound processor 34 by reading and executing the parameter conversion code 1531, the memory management code 1532, and the third sound signal code 1536c that have been written in the main storage device 14 by the writer 33c. The sound processor 34 executes the sound processing. The sound processor 34 includes the first executer 36 and a second executer 39.

Operation of the sound processing apparatus 100 is described with reference to FIG. 14 to FIG. 16.

Figure 14:
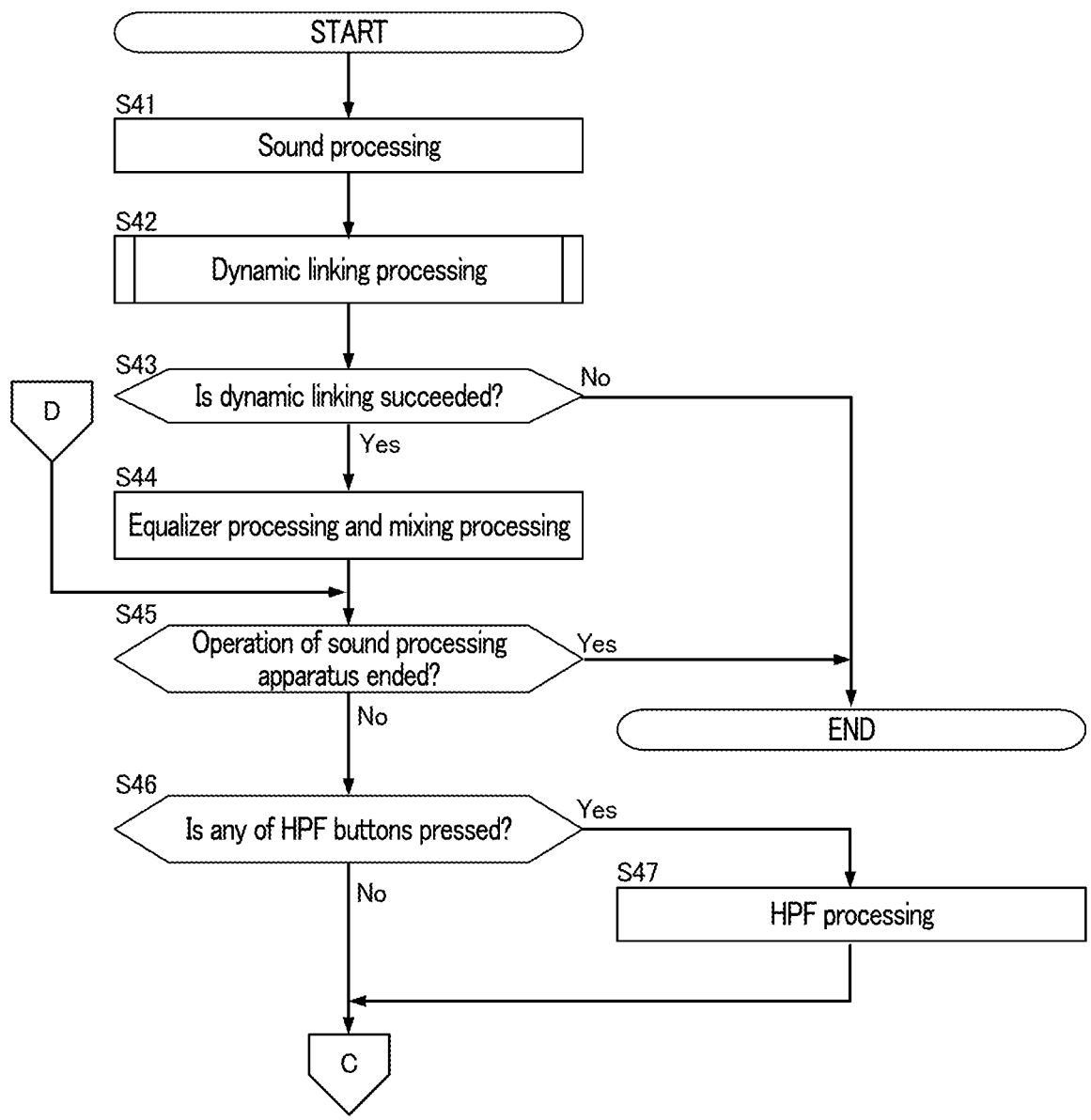
FIG. 14 is a first flowchart illustrating operation of a sound processing apparatus 100 according to a second embodiment.
Figure 15:
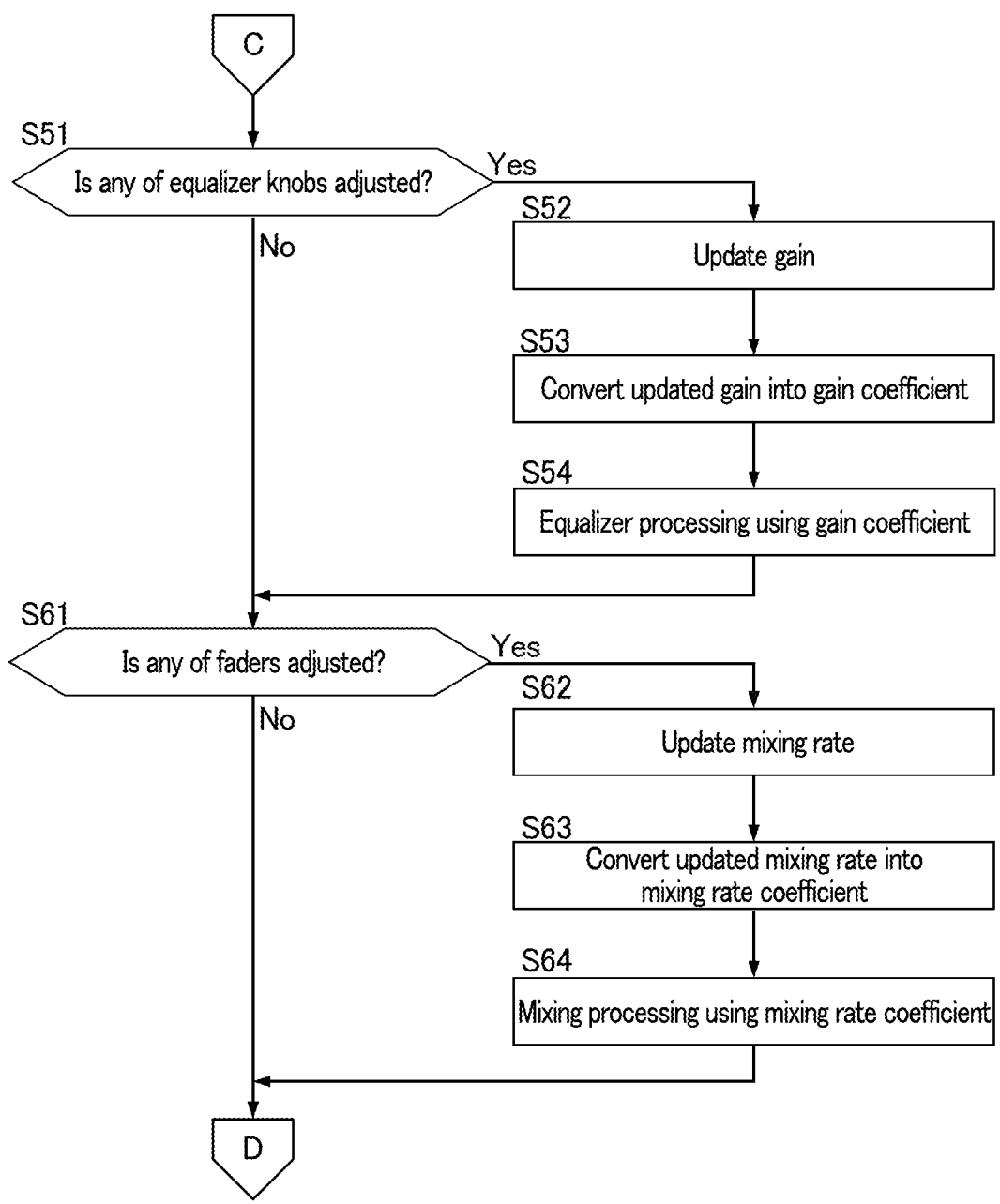
FIG. 15 is a second flowchart illustrating the operation of the sound processing apparatus 100 according to the second embodiment.

FIG. 14 and FIG. 15 are flowcharts illustrating the operation of the sound processing apparatus 100. In step S41, the CPU 13 executes a sound processing process. When the sound processing process calls the sound processing library 153 by the dynamic linking, the link processor 31c executes dynamic link processing on the sound processing library 153c in step S42.

FIG. 16 is a flowchart illustrating the dynamic link processing on the sound processing library 153c. In step S71, the acquirer 32c acquires the information $OP_{CPU}$. Next, in step S72, the acquirer 32c refers to the information $OP_{CPU}$ to determine whether the CPU 13 includes the extended instruction set. When the CPU 13 includes the extended instruction set (Yes in step S72), the writer 33c writes, in step S73, the third sound signal code 1536c associated with the CPU identification information 1538, the parameter conversion code 1531, and the memory management code 1532 in the main storage device 14. Next, in step S74, the link processor 31c outputs notification indicating success of the dynamic linking. The series of processing illustrated in FIG. 16 then ends.

When the CPU 13 does not include the extended instruction set (No in step S72), the acquirer 32c acquires, in step S81, the identification information $ID_{DSP}$ on the DSP 16 of the sound processing apparatus 100. Next, in step S82, the acquirer 32c determines whether the sound processing library 153c stored in the auxiliary storage device 15 includes the DSP identification information 1535 having contents that are the same as the contents of the identification information $ID_{DSP}$. When the sound processing library 153c includes the DSP identification information 1535 having the same contents (Yes in step S82), the writer 33c writes, in step S83, the sound signal code 1536 corresponding to the DSP identification information 1535 having the same contents, the parameter conversion code 1531, the memory management code 1532, and the DSP setting code 1533 in the main storage device 14. Next, the link processor 31c executes the processing in step S74. The series of processing illustrated in FIG. 16 then ends.

When the sound processing library 153c does not include the DSP identification information 1535 having the contents same as the contents of the identification information $ID_{DSP}$ (No in step S82), the link processor 31c displays, in step S91, a message indicating that the sound signal processing is not performable, on the display device 11. Next, in step S92, the link processor 31c outputs notification indicating failure of the dynamic linking. The series of processing illustrated in FIG. 16 then ends.

Referring back to FIG. 14, the processing after step S43 is described only when the sound processing apparatus 100 has the configuration of the sound processing apparatus 100c in the flowcharts illustrated in FIG. 14 and FIG. 15 for simplification of the description.

In step S43, the link processor 31c determines whether the dynamic linking has succeeded. When the dynamic linking has failed (No in step S43), the sound processing apparatus 100 terminates the series of processing illustrated in FIG. 14 and FIG. 15.

In contrast, when the dynamic linking has succeeded (Yes in step S43), the second executer 39 executes the equalizer processing and the mixing processing of the sound signal processing in step S44. More specifically, the first executer 36 converts the gains included in the parameters 152 into gain coefficients interpretable by the DSP 16, and the second executer 39 executes the equalizer processing using the gain coefficients. Furthermore, the first executer 36 converts the mixing rates included in the parameters 152 into mixing rate coefficients interpretable by the DSP 16, and the second executer 39 executes the mixing processing using the mixing rate coefficients.

In step S45 after end of the processing in step S44, the CPU 13 determines whether an instruction to terminate the operation of the sound processing apparatus has been received. When the instruction to terminate the operation of the sound processing apparatus 100 has been received (Yes in step S45), the sound processing apparatus 100 terminates the series of processing illustrated in FIG. 14 and FIG. 15.

When the instruction to terminate the operation of the sound processing apparatus 100 has not been received (No in step S45), the sound processor 34 determines in step S46 whether pressing operation of any of the HPF buttons 121 has been received. When the pressing operation of any of the HPF buttons 121 has been received (Yes in step S46), the second executer 39 executes the HPF processing in step S47. More specifically, the second executer 39 executes the HPF processing on the corresponding sound signal $S_{in}$ input after receiving the pressing operation of the HPF button 121.

After the end of processing in step S47 or in a case in which no pressing operation of any of the HPF buttons 121 has been received (No in step S46), the sound processor 34 determines in step S51 whether a value indicated by any of the equalizer knobs 122 has been changed. When a value indicated by any of the equalizer knobs 122 has been changed (Yes in step S51), the first executer 36 updates, in step S52, the corresponding gain included in the parameters 152 with a gain to be changed. Next, in step S53, the first executer 36 converts the updated gain into a gain coefficient interpretable by the DSP 16. Thereafter, in step S54, the second executer 39 executes the equalizer processing using the gain coefficient, on the corresponding sound signal $S_{in}$ input after the gain coefficient is converted.

After the end of processing in step S54 or in a case in which no value indicated by any of the equalizer knobs 122 has been changed (No in step S51), the sound processor 34 determines in step S61 whether the position of any of the faders 123 has been changed. When the position of any of the faders 123 has been changed (Yes in step S61), the sound processor 34 updates, in step S62, the corresponding mixing rate included in the parameters 152 with a mixing rate indicated by the fader 123 changed in position. Next, in step S63, the first executer 36 converts the updated mixing rate into a mixing rate coefficient interpretable by the DSP 16. Thereafter, in step S64, the second executer 39 executes the mixing processing using the mixing rate coefficient, on the sound signals $S_{in}$ of the channels input after the mixing rate coefficient is converted.

After the end of processing in step S64 or in a case in which no positions of any of the faders 123 have been changed (No in step S61), the processing of the sound processor 34 proceeds to processing in step S45.

As described above, in the second embodiment, in the case in which the CPU 13 includes the extended instruction set, the CPU 13 can execute the sound signal processing. The parameter conversion code 1531 and the memory management code 1532 are used in common in both of the following cases: a case in which the CPU 13 executes the sound signal processing; and a case in which the sound processing apparatus 100 includes the DSP 16. Accordingly, as compared with the case in which the parameter conversion code 1531 and the memory management code 1532 are not used in common, it is possible to reduce time and effort of developing the sound processing library 153.

Modifications

Specific modifications added to each of the embodiments illustrated above are illustrated below. Two or more modifications optionally selected from the following illustration may be appropriately combined so long as they do not conflict with each other.

(1) In the first embodiment, the sound processing apparatus 100 can include the first configuration or the second configuration. In other words, the sound processing apparatus 100 includes one of the first DSP 16a and the second DSP 16b; however, the sound processing apparatus 100 may include both of the first DSP 16a and the second DSP 16b. When the sound processing apparatus 100 includes both of the first DSP 16a and the second DSP 16b, the sound processing apparatus 100 may execute the sound signal processing by using either of the first DSP 16a and the second DSP 16b. Examples of a case in which the sound processing apparatus 100 includes a plurality of DSPs 16 include a case in which the user of the sound processing apparatus 100a attaches an extension board including the second DSP 16b to the sound processing apparatus 100a.

For example, it is assumed that the acquirer 32 acquires a plurality of pieces of identification information $ID_{DSP}$ on the DSPs 16 of the sound processing apparatus 100 in step S31. Furthermore, a case is assumed as follows. The acquirer 32 determines that the sound processing library 153 stored in the auxiliary storage device 15 includes a plurality of pieces of DSP identification information 1535 each having contents that are the same as the contents of the identification information $ID_{DSP}$ in step S32. The acquirer 32 may select the DSP 16 performing the sound signal processing, using of the following mode 1A or 1B based on these assumptions.

Mode 1A

For example, the acquirer 32 may select, as the DSP 16 performing the sound signal processing, a DSP having the highest clock frequency among the DSPs 16 indicated by the identification information $ID_{DSP}$ having contents that are the same as the contents of the DSP identification information 1535 included in the sound processing library 153.

Mode 1B

For example, the acquirer 32 may display, on the display device 11, the identification information $ID_{DSP}$ having contents that are the same as the contents of the DSP identification information 1535 included in the sound processing library 153, and may select a DSP indicated by the identification information $ID_{DSP}$ selected by the user, as the DSP 16 performing the sound signal processing.

(2) In the second embodiment, the CPU 13c may be what is called a "multicore processor" that includes cores. Furthermore, a first core of the multicore processor may execute the processing relating to the parameter, and a second core may execute the sound signal processing. For example, the CPU 13c may be a homogeneous multicore processor in which the first core and the second core each include the basic instruction set and the extended instruction set. Alternatively, the CPU 13c may be a heterogeneous multicore processor in which the first core includes only the basic instruction set and the second core includes the basic instruction set and the extended instruction set. Furthermore alternatively, in the second embodiment, the sound processing apparatus 100 may include a plurality of CPUs.

(3) In each of the above-described embodiments, the DSP 16 is one example of a "processor"; however, the processor is not limited thereto. For example, a field programmable gate array (FPGA) may be used as one example of the "processor". The CPU 13 is one example of the "processor"; however, the CPU 13 is not limited thereto. For example, the CPU 13 may be a DSP.

(4) In each of the above-described embodiments, the sound processing apparatus 100 executes, as the sound signal processing, the HPF processing, the equalizer processing, and the mixing processing; however, the sound signal processing is not limited to these three types of processing. When the sound processing apparatus 100 executes one or both of the HPF processing and the equalizer processing but does not execute the mixing processing, a single sound signal (e.g., $S_{in1}$) is used.

(5) In each of the above-described embodiments, the parameters 152 do not include the parameter relating to the HPF processing; however, the parameters 152 may include the parameter relating to the HPF processing. For example, the sound processing apparatus 100 may receive the cutoff frequency of the HPF processing from the user, and the first executer 36 may update the cutoff frequency of the parameters 152 with the cutoff frequency received from the user. The first executer 36 converts the updated cutoff frequency into a cutoff frequency interpretable by the DSP 16. The second executer 39 executes the HPF processing using the converted cutoff frequency.

(6) In each of the above-described embodiments, the DSP 16 or the CPU 13c executes the HPF processing, the equalizer processing, and the mixing processing by reading the sound processing library 153; however, libraries for respective processing may be present. For example, the auxiliary storage device 15 may include three libraries that are a library for executing the HPF processing, a library for executing the equalizer processing, and a library for executing the mixing processing. The libraries for the respective processing are provided, which enables the developer of the sound processing library 153 to easily add new processing.

(7) In each of the above-described embodiments, the DSP setting processing including the processing to set the first DSP 16a and the processing to set the second DSP 16b is described in the DSP setting code 1533; however, the DSP setting code 1533 is not limited thereto. For example, the sound processing library 153 may include, in place of the DSP setting code 1533, a first DSP setting code 1533a that defines steps of the processing to set the first DSP 16a, and a second DSP setting code 1533b that defines steps of the processing to set the second DSP 16b. When the sound processing library 153 includes the first DSP setting code 1533a and the second DSP setting code 1533b, the first DSP identification information 1535a is associated with the first DSP setting code 1533a and the first sound signal code 1536a. Likewise, the second DSP identification information 1535b is associated with the second DSP setting code 1533b and the second sound signal code 1536b. In step S33, the writer 33 writes the DSP setting code 1533 corresponding to the DSP identification information 1535 having the same contents in the main storage device 14, in place of the DSP setting code 1533.

(8) In each of the above-described embodiments, the processing to adjust the frequency characteristics of the sound signal is described as one example of the processing to adjust the sound quality of the sound signal; however, the processing to adjust the sound quality of the sound signal is not limited thereto. Other examples of the processing to adjust the sound quality of the sound signal include processing to provide spatial expansiveness to sound represented by the sound signal, and dynamics processing to adjust volume of sound represented by the sound signal. Examples of the processing to provide spatial expansiveness to sound represented by the sound signal include delay processing and reverberation processing. The delay processing refers to processing to mix the input sound signal with a sound signal delayed in time. The reverberation processing refers to processing to mix the input sound signal with a sound signal representing reverberant sound of the sound represented by the input sound signal or with a sound signal representing reflection sound of the sound represented by the input sound signal. The dynamics processing includes, for example, compressor processing to reduce change in the volume of the sound represented by the sound signal and limiter processing to reduce the volume of the sound represented by the sound signal to be lower than or equal to a prescribed volume when the volume exceeds a preset threshold. The sound processing apparatus 100 may execute, as the filter processing, processing other than the HPF processing and the LPF processing. Examples of the processing other than the HPF processing and the LPF processing include gate processing to output a sound signal only when a sound signal representing sound having a volume higher than or equal to a predetermined value is input.

(9) The functions of the sound processing apparatus 100 illustrated above are achieved by cooperation of the CPU 13, the DSP 16, and the program stored in the auxiliary storage device 15 as described above. The program according to the present disclosure may be provided in a form stored in a computer-readable recording medium and may be installed in a computer. The recording medium is, for example, a non-transitory recording medium, and an optical recording medium (optical disk) such as a CD-ROM is suitable; however, the recording medium also include a recording medium in a known optional format such as a semiconductor recording medium and a magnetic recording medium. The non-transitory recording medium may be an optional recording medium except for a transitory, propagating signal. A volatile recording medium is not excluded.

(10) The sound processing apparatus 100 illustrated above is applicable to an optional sound processing apparatus that executes the sound processing, in addition to the mixer. The sound processing apparatus 100 is applicable to, for example, a recorder, an effector, and an amplifier.

(11) For example, the following configuration is understood from the embodiments illustrated above.

A recording medium according to an aspect (Aspect A1) of this disclosure is a non-transitory computer readable recording medium having recorded therein a library program executable by a main processor, the main processor being provided in a sound processing apparatus, the library program includes: a first executable code that defines steps of first processing of sound processing and that is written using an instruction set for the main processor; a second executable code that defines steps of second processing of the sound processing and that is written using an instruction set for a first processor; and a third executable code that defines the steps of the second processing of the sound processing and that is written using an instruction set for a second processor, in which the library program, when executed by the main processor provided in the sound processing apparatus, causes the main processor to: execute the first executable code; transmit, in a case where the sound processing apparatus further includes the first processor, the second executable code to the first processor, thereby setting the first processor to a state in which the first processor is capable of executing the second processing of the sound processing; and transmit, in a case where the sound processing apparatus further includes the second processor, the third executable code to the second processor, thereby setting the second processor to a state in which the second processor is capable of executing the second processing of the sound processing.

According to this aspect, the first executable code is used in common in both of the following cases: a case in which the sound processing apparatus includes the first processor; and a case in which the sound processing apparatus includes the second processor. Accordingly, as compared with a case in which the first executable code is not used in common, it is possible to reduce time and effort of developing library programs.

In an example of an aspect (Aspect A2) according to Aspect A1, the library program, when executed by the main processor, causes the main processor to execute the first executable code irrespective of whether the sound processing apparatus further includes the first processor or the second processor.

According to this aspect, since the first executable code is used in common in both of a case in which the sound processing apparatus includes the first processor and a case in which the sound processing apparatus includes the second processor, it is possible to reduce time and effort of developing library programs.

A recording medium according to an aspect (Aspect A3) of the present disclosure is a non-transitory computer readable recording medium having recorded therein a library program executable by a main processor, the main processor being provided in a sound processing apparatus, the library program includes: a first executable code that defines steps of first processing of sound processing and that is written using a first instruction set for the main processor; a second executable code that defines steps of second processing of the sound processing and that is written using a second instruction set; and a third executable code that defines the steps of the second processing of the sound processing and that is written using an instruction set for a first processor, in which the library program, when executed by the main processor provided in the sound processing apparatus, causes the main processor to: execute the first executable code; execute, in a case where the main processor has the second instruction set, the second executable code; and transmit, in a case where the sound processing apparatus further includes the first processor, the third executable code to the first processor, thereby setting the first processor to a state in which the first processor is capable of executing the second processing of the sound processing.

According to this aspect, the first executable code is used in common in both of the following cases: a case in which the processor includes the second instruction set; and a case in which the sound processing apparatus includes the processor. Accordingly, as compared with a case in which the first executable code is not used in common, it is possible to reduce time and effort of developing library programs.

In an example of an aspect (Aspect A4) according to any one of Aspect A1 to A3, the library program is called by dynamic linking from a process executed by the main processor.

According to this configuration, for example, a developer of the sound processing apparatus is not required to register the plurality of library programs on a web site. Therefore, the user can store one sound processing library registered on the web site in the sound processing apparatus without considering the library program appropriate to the configuration of the sound processing apparatus owned by the user.

In an example of an aspect (Aspect A5) according to any one of Aspect A1 to A4, the first processing of the sound processing includes conversion processing to convert first data received from a user into second data interpretable by the first processor or the second processor, and the second processing of the sound processing includes: (i) processing to adjust sound quality using the second data; (ii) processing to mix a plurality of sound signals using the second data; or both (i) processing to adjust the sound quality using the second data and (ii) processing to mix the plurality of sound signals using the second data.

According to this aspect, the first processing is executed by the main processor, and the second processing is executed by the first or the second processor, thereby making it possible to distribute the loads.

In an example of an aspect (Aspect A6) according to Aspect A5, the main processor is configured to access a storage, the first processing of the sound processing further includes processing to update third data stored in the storage in response to an instruction from the user, and the conversion processing includes processing to convert the updated third data into data interpretable by the first processor or the second processor.

According to this aspect, the sound processing apparatus enables execution to update data stored in the memory in response to an instruction from the user.

In an example of an aspect (Aspect A7) according to Aspect A4, the library program is linked to a link program by the dynamic linking, the library program further includes: first identification information that identifies a processor that is capable of executing the second executable code; and second identification information that identifies a processor that is capable of executing the third executable code, the first identification information is associated with the second executable code, the second identification information is associated with the third executable code, the main processor is configured to access a volatile storage, and the link program, when executed by the main processor, causes the main processor to: acquire identification information on a processor included in the sound processing apparatus, the processor being the first processor or the second processor, when the main processor calls the library program by the dynamic linking; and write, in the volatile storage, an executable code that is associated with identification information having contents that are same as contents of the acquired identification information.

According to this aspect, the main processor writes, in the memory, either of the second executable code and the third executable code, and does not write the other. Accordingly, as compared with a case in which the other executable code is also written in the storage, the sound processing apparatus enables minimizing use of the storage.

A sound processing apparatus according to another aspect (Aspect A8) of this disclosure includes a main processor; and a storage that stores therein a library program that is executable by the main processor, in which: the library program comprises: a first executable code that defines steps of first processing of sound processing and that is written using an instruction set for the main processor; a second executable code that defines steps of second processing of the sound processing and that is written using an instruction set for a first processor; and a third executable code that defines the steps of the second processing of the sound processing and that is written using an instruction set for a second processor, and in which the library program, when executed by the main processor provided in the sound processing apparatus, causes the main processor to: execute the first executable code; transmit, in a case where the sound processing apparatus further includes the first processor, the second executable code to the first processor, thereby setting the first processor to a state in which the first processor is capable of executing the second processing of the sound processing; and transmit, in a case where the sound processing apparatus further includes the second processor, the third executable code to the second processor, thereby setting the second processor to a state in which the second processor is capable of executing the second processing of the sound processing.

According to this configuration, the first executable code is used in common in both of the following cases: a case in which the sound processing apparatus includes the first processor; and a case in which the sound processing apparatus includes the second processor. Accordingly, as compared with a case in which the first executable code is not used in common, it is possible to reduce time and effort for developing library programs.

DESCRIPTION OF REFERENCE SIGNS

13 CPU
14 Main storage device
15 Auxiliary storage device
31 Link processor
32 Acquirer
33 Writer
34 Sound processor
35 CPU sound processor
36 First executer
37 DSP setter
39 Second executer
100 Sound processing apparatus
151 Link program
153 Sound processing library
1531 Parameter conversion code
1532 Memory management code
1533 DSP setting code

What is claimed is:

1. A non-transitory computer readable recording medium having recorded therein a library program executable by a main processor, the main processor being provided in a sound processing apparatus that includes a plurality of channels respectively corresponding to a plurality of sound signals and that is configured to output an output sound signal obtained by executing sound processing on each of the plurality of sound signals and by mixing the plurality of sound signals respectively corresponding to the plurality of channels, the library program comprising:
a first executable code that defines steps of first processing of sound processing and that is written using an instruction set for the main processor;
a second executable code that defines steps of second processing of the sound processing and that is written using an instruction set for a first processor; and
a third executable code that defines the steps of the second processing of the sound processing and that is written using an instruction set for a second processor,
wherein the library program, when executed by the main processor provided in the sound processing apparatus, causes the main processor to:
execute the first executable code;
transmit, in a case where the sound processing apparatus further includes the first processor, the second executable code to the first processor, thereby setting the first processor to a state in which the first processor is configured to execute the second processing of the sound processing (i) to adjust a sound quality of each of the plurality of sound signals respectively corresponding to the plurality of channels and (ii) to mix the plurality of sound signals respectively corresponding to the plurality of channels; and
transmit, in a case where the sound processing apparatus further includes the second processor, the third executable code to the second processor, thereby setting the second processor to a state in which the second processor is configured to execute the second processing of the sound processing (i) to adjust a sound quality of each of the plurality of sound signals respectively corresponding to the plurality of channels and (ii) to mix the plurality of sound signals respectively corresponding to the plurality of channels.

2. The recording medium according to claim 1, wherein the library program, when executed by the main processor, causes the main processor to execute the first executable code irrespective of whether the sound processing apparatus further includes the first processor or the second processor.

3. The recording medium according to claim 1, wherein the library program is callable by dynamic linking from a process executed by the main processor.

4. The recording medium according to claim 3, wherein:
the library program is linked to a link program by the dynamic linking,
the library program further includes:
first identification information that identifies a processor that is capable of executing the second executable code; and
second identification information that identifies a processor that is capable of executing the third executable code,
the first identification information is associated with the second executable code,
the second identification information is associated with the third executable code,
the main processor is configured to access a volatile storage, and
the link program, when executed by the main processor, causes the main processor to:
acquire identification information on a processor included in the sound processing apparatus, the processor being the first processor or the second processor, when the main processor calls the library program by the dynamic linking; and
write, in the volatile storage, an executable code that is associated with identification information having contents that are same as contents of the acquired identification information.

5. The recording medium according to claim 1, wherein:
the first processing of the sound processing includes conversion processing to convert first data received from a user into second data interpretable by the first processor or the second processor, and
the second processing of the sound processing includes:
(i) processing to adjust the sound quality of each of the plurality of sound signals using the second data;
(ii) processing to mix the plurality of sound signals using the second data; or
both (i) processing to adjust the sound quality of each of the plurality of sound signals using the second data and (ii) processing to mix the plurality of sound signals using the second data.

6. The recording medium according to claim 5, wherein:
the main processor is configured to access a storage,
the first processing of the sound processing further includes processing to update third data stored in the storage in response to an instruction from the user, and
the conversion processing includes processing to convert the updated third data into data interpretable by the first processor or the second processor.

7. A sound processing apparatus that includes a plurality of channels respectively corresponding to a plurality of sound signals and that is configured to output an output sound signal obtained by executing sound processing on each of the plurality of sound signals and by mixing the plurality of sound signals respectively corresponding to the plurality of channels, the sound processing apparatus comprising:
- a main processor; and
- a storage that stores therein a library program that is executable by the main processor, wherein:

the library program comprises:

a first executable code that defines steps of first processing of sound processing and that is written using an instruction set for the main processor;

a second executable code that defines steps of second processing of the sound processing and that is written using an instruction set for a first processor; and a third executable code that defines the steps of the second processing of the sound processing and that is written using an instruction set for a second processor, and wherein the library program, when executed by the main processor provided in the sound processing apparatus, causes the main processor to:

execute the first executable code;

transmit, in a case where the sound processing apparatus further includes the first processor, the second executable code to the first processor, thereby setting the first processor to a state in which the first processor is configured to execute the second processing of the sound processing (i) to adjust a sound quality of each of the plurality of sound signals respectively corresponding to the plurality of channels and (ii) to mix the plurality of sound signals respectively corresponding to the plurality of channels; and transmit, in a case where the sound processing apparatus further includes the second processor, the third executable code to the second processor, thereby setting the second processor to a state in which the second processor is configured to execute the second processing of the sound processing (i) to adjust a sound quality of each of the plurality of sound signals respectively corresponding to the plurality of channels and (ii) to mix the plurality of sound signals respectively corresponding to the plurality of channels.

* * * * *